Dec. 17, 1968  G. A. HUGHES ET AL  3,417,105
9,10-SECOGONENES

Filed April 7, 1966  2 Sheets-Sheet 1

INVENTORS
GORDON ALAN HUGHES
HERCHEL SMITH

BY V. V. Bellino

ATTORNEY

Dec. 17, 1968　　G. A. HUGHES ET AL　　3,417,105
9,10-SECOGONENES

Filed April 7, 1966　　2 Sheets-Sheet 2

INVENTORS
GORDON ALAN HUGHES
HERCHEL SMITH

BY　V. V. Bellino

ATTORNEY

United States Patent Office 3,417,105
Patented Dec. 17, 1968

3,417,105
9,10-SECOGONENES
Gordon Alan Hughes, Haverford, Pa., and Herchel Smith, 500 Chestnut Lane, Wayne, Pa. 19087; said Hughes assignor to said Smith
Continuation-in-part of application Ser. No. 228,384, Oct. 4, 1962. This application Apr. 7, 1966, Ser. No. 540,923
21 Claims. (Cl. 260—340.9)

ABSTRACT OF THE DISCLOSURE

A 2-alkyl-2-(6-phenyl-3-oxohexyl)-1,3 - cyclopentanedione having an activating group on the phenyl substituent and at least one position ortho to the position of chain attachment free of substituent groups is cyclized under aldol conditions to give a 4-phenethyl-5,6,7,8-tetrahydroindane-1,5-dione which upon hydrogenation to the corresponding saturated indane and cyclodehydration forms a gona-1,3,5(10),9(11)-tetraene nucleus convertible upon reduction to gona-1,3,5(10)-trienes having the natural steroid configuration.

---

This application is a continuation-in-part of co-pending application Ser. No. 228,384, filed Oct. 4, 1962.

This invention relates to compositions of matter classified in the art of chemistry as substituted unsaturated gonane derivatives, to intermediates therefor, and to processes for making and using such compositions.

In describing the invention, reference will be made in the following specification to the annexed drawings wherein.

The invention sought to be patented in a principal composition aspect is described as residing in the concept of a 5,6,7,8-tetrahydrophenethylindan-1,5-dione nucleus having attached thereto in the 8-position, a monovalent alkyl radical and in which the phenyl of the 4-phenethyl group of said nucleus is unsubstituted in at least one position ortho to the point of attachment.

The tangible embodiments of the composition aspect of the invention possess the inherent general physical properties of being viscous oils or low melting white solids, which are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The compositions of this invention are useful in practicing the process aspect of the present invention in making gonane compositions which have valuable hormonal activities.

Figure 2:
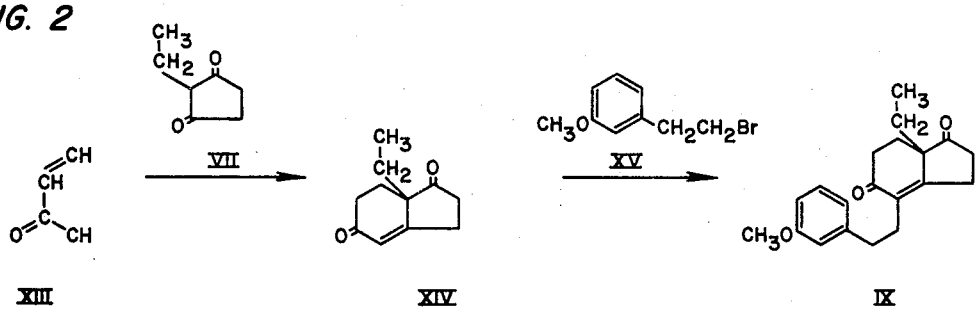
FIGURE 2 illustrates schematically a reaction sequence for preparing a tetrahydro-4-phenethyl-8-alkylindane, specifically 5,6,7,8-tetrahydro-4-m-methoxyphenethyl-8-ethylindane-1,5-dione.

The invention sought to be patented, in a principal process of making the composition aspect, as illustrated in annexed FIGURE 2, is described as residing in the concept of the sequence of reactions including: treating a compound with a 2-alkyl-2-(6-phenyl-3-oxohexyl)-1,3-cyclopentanedione nucleus (FIG. I, VIII) under aldol condensation conditions, i.e., in the presence of a basic catalyst, and when a suitable activating substituent is not present on the aromatic ring, in the presence of an acid catalyst, to form the tricyclic diketone (IX): reducing the C-ring unsaturation to form Compound X by whatever mechanism the hydrogen at the 4-position (8-position steroid numbering) is introduced, it can on treatment with an acid or base take up the most stable configuration, by equilibrating through keto-enol tautomerism with the adjacent keto; thus when the hydrogen at the 9-position (14-position steroid numbering) is α, having been introduced trans to the 8-substituent (13-substituent steroid numbering) by stereospecific means, the hydrogen on the 4-position (8-position steroid numbering) will on equilibration be β so that the natural configuration results: closing the B-ring under acidic conditions at low temperature to form Compound XI; and reducing the 9(11) bond to form Compound XII.

The invention sought to be patented in a second composition aspect is described as residing in the concept of a hexahydro-4-phenethyl-trans-indane-1,5-dione nucleus having attached thereto in the 8-position a monovalent polycarbonalkyl radical, and in which the phenyl of the 4-phenethyl group of said nucleus is unsubstituted in at least one position ortho to the point of attachment.

The tangible embodiments of said second composition aspect possess the use characteristic of being intermediates for the preparation of compositions which possess the use characteristic of exerting hormonal effects with unexpected separation of activity as evidenced by standard test procedures.

The invention sought to be patented in a third composition aspect is described as residing in the concept of a 5,6,7,8 - tetrahydro-4-phenethylindan-1-ol-5-one nucleus having attached thereto in the 8-position a monovalent polycarbonalkyl radical and in which the phenyl of the 4-phenethyl group of said nucleus is unsubstituted in at least one position ortho to the point of attachment.

The tangible embodiments of said third composition aspect possess the use characteristic of being intermediates for the preparation of compositions which possess the use characteristic of exerting hormonal effects with unexpected separation of activity as evidenced by standard test procedures.

The invention sought to be patented in a fourth composition aspect is described as residing in the concept of a hexahydro-4-phenethyl-trans-indan-1-ol-5-one nucleus having attached thereto in the 8-position a monovalent polycarbonalkyl radical, and in which the phenyl of the 4-phenethyl group of said nucleus is unsubstituted in at least one position ortho to the point of attachment.

The tangible embodiments of said fourth composition aspect possess the use characteristic of being intermediates for the preparation of compositions which possess the use characteristic of exerting hormonal effects with unexpected separation of activity as evidenced by standard test procedures.

The invention sought to be patented in a second process aspect is described as residing in the concept of reacting a compound having a 5,6,7,8-tetrahydroindan-5-one nucleus having attached thereto in the 8-position a monovalent alkyl group (FIGURE 2, XIV) under basic conditions with a suitable phenethylating reagent (e.g., m-methoxyphenethyl bromide and phenethyl benzene sulfonate) to obtain a 5,6,7,8-tetrahydro-4-phenethylindan-5-one having attached thereto in the 8-position an alkyl group (IX).

Figure 3:
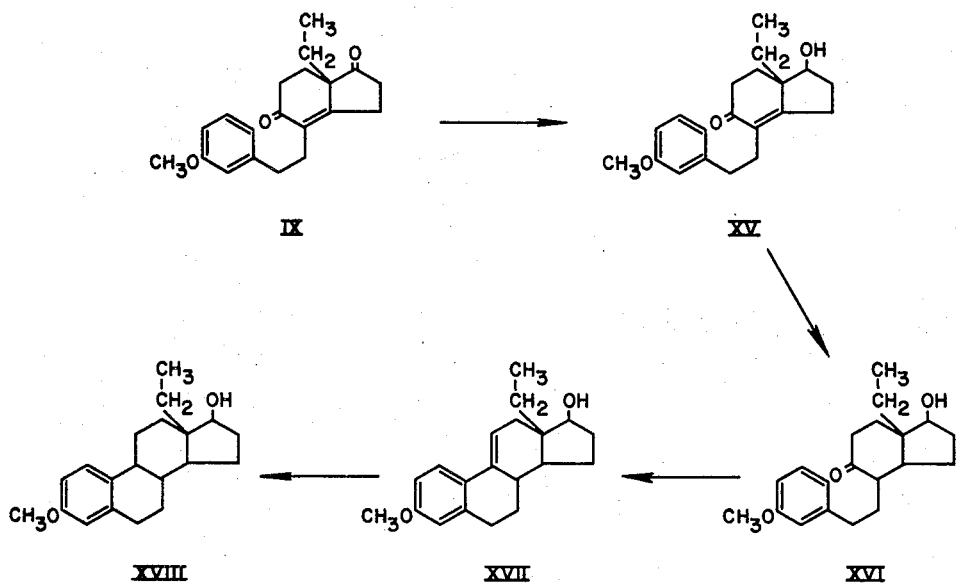
FIGURE 3 illustrates schematically a reaction sequence for preparing a 13-alkylgona-1,3,5(10)-trien-17β-ol from a tetrahydro-4-phenethyl-8-alkylindane, specifically 13β-ethyl-3-methoxygona-1,3,5(10)-trien-17β-ol from 5,6,7,8-tetrahydro-4-m-methoxyphenethyl-8-ethylindane1,5dione.

The invention sought to be patented in a third process aspect, as illustrated in annexed FIGURE 3, is described as residing in the concept of a sequence of reactions to form the gonane structure with the natural configuration of hydrogen atoms at the 8- and 14-positions including: selectively reducing the 1-keto group of a 5,6,7,8-tetrahydro-4-phenethylindane-1,5-dione in the presence of a suitable reducing agent, such as sodium borohydride, to form a 5,6,7,8-tetrahydro-4-phenethylindan-1-ol-4-one (XV); reducing the C-ring unsaturation to form the hexahydro Compound XVI (by whatever mechanism the hydrogen at the 4-position is introduced, it can on treatment with an acid or base take up the most stable configuration): closing the B-ring under acidic conditions at low temperature to form a gona-1,3,5(10),9(11)-tetraene (XVII): and reducing the 9(11) bond to form a gona-1,3,5(10)-triene (XVIII).

Figure 4:
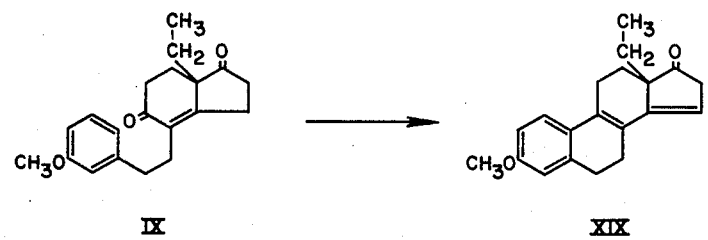
FIGURE 4 illustrates schematically the cyclisation of a tetrahydro-4-phenethyl-8-alkylindane to a 13-alkylgona-1,3,5(10),8,14-pentaene, specifically 13β-ethyl-3-methoxygona-1,3,5(10),8,14-pentaen-17-one from 5,6,7,8-tetrahydro-4-m-methoxyphenethyl-8-ethylindane, 1,5-dione.

The invention sought to be patented in a fourth process aspect, as illustrated in annexed FIGURE 4, is described as residing in the concept of treating a compound having a 5,6,7,8-tetrahydro-4-phenethylindane-1,5-dione nucleus having attached thereto in the 8-position a monovalent alkyl group which has an ortho-para directing substituent attached to the aromatic ring (FIGURE 4, IX), with a suitable dehydrating acid, such as polyphosphoric acid, under conditions which result in the removal of water to form a tetracyclic compound (FIGURE 4, XIX).

Figure 1:
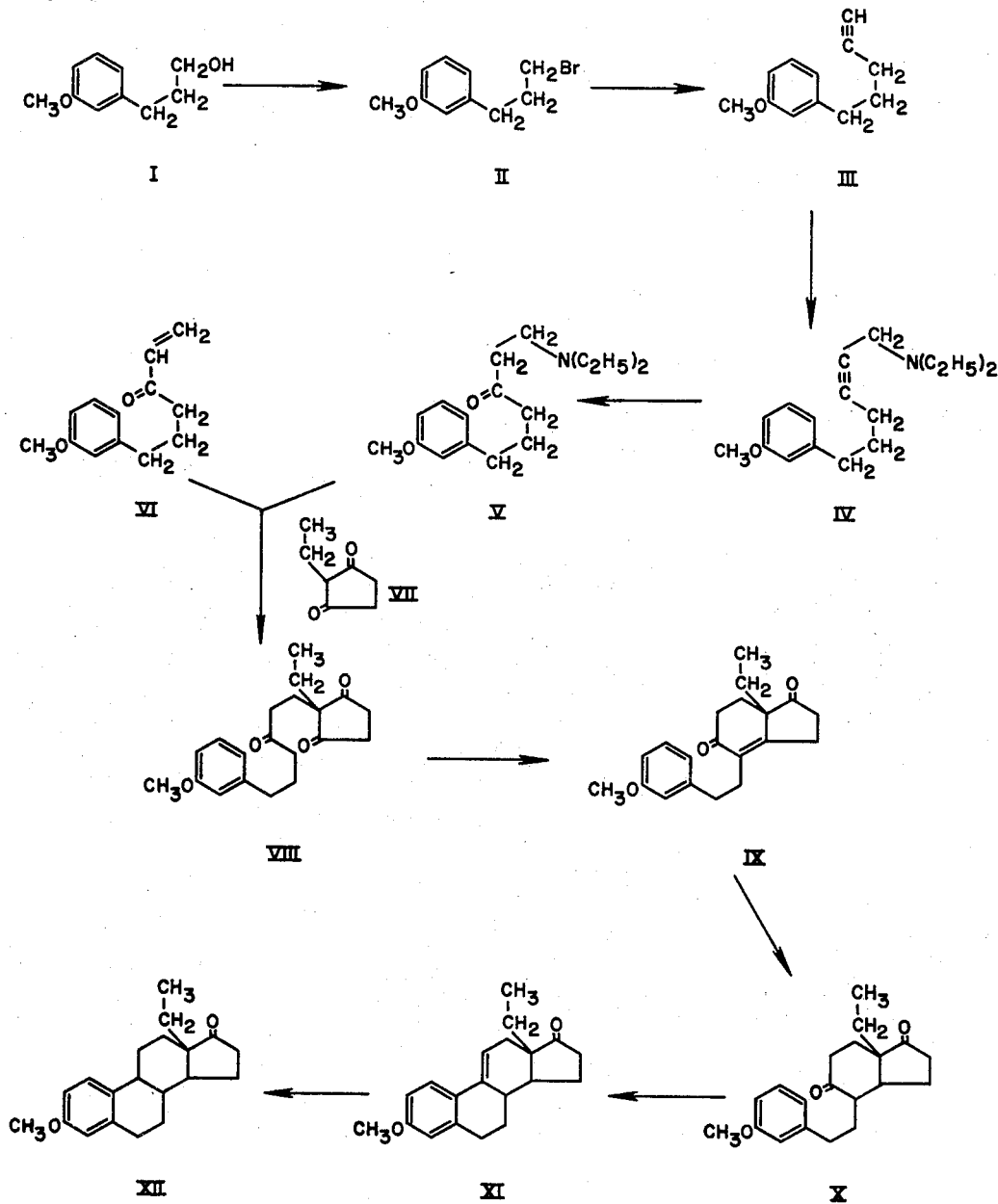
FIGURE 1 illustrates schematically the reaction sequence for preparing a 13-alkylgona-1,3,5(10)-triene, specifically 13β-ethyl-3-methoxygona-1,3,5(10)-trien-17-one.

The manner and process of making and using the invention will now be generally described so as to enable a person skilled in the art of chemistry to make and use the same, as follows:

Referring now to FIGURE 1, wherein the compounds are assigned Roman numerals for identification schematically, the sequence of reactions involved in the synthesis of a specific embodiment, namely hexahydro-4-m-methoxyphenethyl-8-ethyl-trans-indane-1,5-dione and its conversion to a gona-1,3,5(10)-triene, namely 13β-ethyl-3-methoxygona-1,3,5(10)-trien-17-one is illustrated. 3-(m-methoxyphenyl)propanol (I) is heated with phosphorus tribromide in benzene after dropwise addition in the cold to form 3-(m-methoxyphenyl)propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% Formalin, acetic acid, diethylamine, dioxan and cuprous chloride at 70° C. for about 12 hours, whereby there is obtained 1-diethylamino-6-(m-methoxyphenyl)-2-hexyne (IV) which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6-(m-methoxyphenyl)-1-hexen-3-one (VI). Either the ketamine (V) or the ketone (VI), or mixtures thereof, is then reacted with 2-ethyl-1,3-cyclopentanedione (VII) under Michael condensation conditions, e.g., refluxing in methanolic potassium hydroxide to form 2-ethyl-2-[6-(m-methoxyphenyl)-3-oxohexyl]-1,3 - cyclopentanedione (VIII). Compound VIII is then internally condensed and dehydrated under basic conditions to form 8-ethyl-5,6,7,8-tetrahydro-4-m-methoxyphenethylindane-1,5-dione. The newly formed unsaturation of compound IX is hydrogenated to form 8-ethylhexahydro-4-m-methoxyphenethyl-trans-indane-1,5-dione (X). B-ring closure of Compound X proceeds at room temperature under acidic conditions to form 13β-ethyl-3-methoxygona-1,3,5(10),9(11)-tetraen-17-one (XI). The unsaturated bond at the 9-position is reduced by hydrogenation, or with alkali metal and liquid ammonia and oxidation of the product to give 13β-ethyl-3-methoxygona-1,3,5(10)-trien-17-one (XII).

To form another specific embodiment of this invention, referring to FIGURE 2, methyl vinyl ketone is reacted under Michael reaction conditions with 2-ethyl-1,3-cyclopentanedione and the product dehydrated to form 5,6,7,8-tetrahydro-8-ethylindane-1,5-dione (XIV) which is then alkylated under basic conditions with m-methoxyphenethyl bromide to form 8-ethyl-5,6,7,8-tetrahydro-4-m-methoxyphenethylindane-1,5-dione (IX).

Referring to FIGURE 3, a third specific embodiment of the invention, 8-ethyl-5,6,7,8-tetrahydro-4-m-methoxyphenethylindan-1-ol-5-one (XV) is formed by selectively reducing 8 - ethyl - 5,6,7,8-tetrahydro-4-m-methoxyphenethylindane-1,5-dione with a complex metal hydride. Compound XV is then hydrogenated to form 8-ethyl-hexahydro - 4-m-methoxyphenethyl-trans-indan-1-ol-5-one (XVI). B-ring closure of Compound XVI proceeds at room temperature under acidic conditions to form 13β-ethyl - 3 - methoxygona - 1,3,5(10),9(11)-tetraen-17β-ol (XVII). The unsaturated bond at the 9-position is reduced by hydrogenation or alternatively by treatment with alkali metal and liquid ammonia and to give 13β-ethyl-3-methoxygona-1,3,5(10)-trien-17β-ol (XVIII).

While the hereinbefore described processes produce novel and steroidal-like compounds which have an unnatural substituent at the 13-position, it is apparent that the novel and valuable processes of the invention offer a unique feasible route to the corresponding natural steroids if the nucleophilic compound used in the Michael reaction step is 2-methyl-1,3-cyclopentanedione.

The aromatic ring of the phenylpropanol (FIGURE 1, I) used as the starting material for the preparation of the compositions and initial preparations of the invention may have one or more substituents, provided, however, at least one position ortho to the position of propanolchain attachment is unsubstituted so that cyclodehydration to form a cyclic structure can eventually be effected. To activate such ortho position for said subsequent ring closure, a para-directing group (referring to electrophilic aromatic substitution) such as hydroxy, acyloxy, alkoxy, amino, alkylamino, or acylamino is a necessary substituent on the aromatic ring. For the processes of the invention and except for the limitations expressed in this specification, variations of the substituents on the A-ring of the tricyclic structures or the intermediates leading thereto, are full equivalents of each other.

The carbon atom to which the phenyl group of the starting propanol (I) is attached can be substituted, as, for example, with an alkyl group, such as methyl or ethyl. Moreover, this atom, to which the phenyl group is attached in Compound I, need not necessarily be carbon. It can be a hetero atom which would not interfere with subsequent catalytic reductions, as, for example, oxygen or nitrogen. This atom will appear in the tetracyclic structures in the 6-position, and it will be apparent, may be, as in the case of nitrogen, substituted with hydrogen or an alkyl group.

The 2-carbon atom of the starting phenyl-propanol (I) can also be substituted, as, for example, with an alkyl group, such as methyl or ethyl, and, as such, be unchanged throughout the subsequent synthesis. In the tetracyclic structures, this carbon atom will appear at the 7-position.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent, or a 1-hydroxy substituent will react with the nucleophilic compound to form the Michael product. The nucleophilic compound can be a carbocyclic-1,3-dione of varying ring size, as for example, a five-membered ring, a six-membered ring, etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acylic nucleophilic compounds can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other.

When the nucleophilic compound is 2-methyl-1,3-cyclopentanedione, the invention provides a unique total synthesis for natural steroids: the hydrogens at the 8-position, 9-position, and 14-position being $\beta$, $\alpha$, and $\alpha$, respectively, as in the natural steroids. Thus such valuable therapeutic substances as estrone, estradiol, and 19-nortestosterone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position. Thus, by varying the substituent at the 2-position of the 1,3-cyclopentanedione, alkyl groups of varying chain length such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generality of the foregoing, an aralkyl, cycloalkylalkyl, or a polycarbon-alkylene bridge bearing a hydroxy-, amino-, or alkylamino- substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position alkyl substituents.

In any of the structures of the invention wherein the 17-position, or position corresponding thereto in the gonane nucleus, is carbonyl, the carbonyl group can be converted to a group such as hydroxymethylene by lithium aluminum hydride reduction; to acyloxymethylene by esterification of the hydroxymethylene group so formed; to alkoxymethylene by etherification of the hydroxymethylene group; to alkylhydroxymethylene by addition of the appropriate organo-metallic reagent to the carbonyl; or to alkynylhydroxymethylene by addition of the appropriate alkali metal acetylide in a suitable inert solvent; all in the known manners. The carbonyl group may also be ketalized or thioketalized by treating with the appropriate alcohol or glycol in a suitable solvent under acidic conditions, as in the presence of an acid such as sulfuric acid, p-toluene sulfonic acid, or boron trifluoride etherate, with heating where necessary, according to the known art.

Similarly, in the 9,10-secogonane structures of the invention which possess an 8,14 bond and wherein the 9 and 17 positions is carbonyl, the non-conjugated carbonyl group at position 17 can be selectively reduced to hydroxymethylene with a suitable reducing agent such as sodium borohydride. Under more vigorous reducing conditions, such as lithium aluminum hydride, the carbonyl groups at both the 9 and 17-position will be reduced to hydroxymethylene. The alcohol allylic to the 8(14) double bond at position 9 in the 9,17-diol so formed can then be selectively oxidised to carbonyl under Oppenauer conditions or by means of manganese dioxide.

The specific reactions involved in the processes of the invention will now be considered, as follows, reference being made to the drawings for typifying compounds:

The vinyl ketones (VI) are prepared by elimination of dialkylamine from the corresponding dialkylaminoethyl aminoketones (V), obtained by hydration of the acetylenic linkage in an acetylenic amine (IV). The acetylenic amines (IV) can be themselves prepared by a Mannich reaction from the corresponding acetylene (III) with formaldehyde and dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl amine, followed by hydration, or by quaternization of the ketoamine. The vinyl ketones can be prepared from these derivatives by the above elimination reaction. Thus the ketoamine on its quaternary salt can be treated with a base for this purpose, for example, with sodium hydroxide or a sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketone derivative employed is a keto-amine and dialkylamine is eliminated in the reaction, no added base may be required. When the compound is a 2-alkylcyclopentane-1,3-dione (VII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

As hereinbefore noted, monocyclodehydration of the C-ring is accomplished by an internal aldol condensation. The cyclodehydration can therefore be carried out using conditions generally applicable for an aldol condensation, i.e., in the presence of an acid or basic catalyst, such as NaOH, p-toluene sulfonic acid, triethylamine benzoate, aluminum tertiary butoxide, and the like, either at room temperature or accompanied by heating if necessary. In most instances, we prefer to carry out the cyclic dehydration at the boiling point of the solvent to permit azeotropic removal of the water formed during the course of the reaction, inasmuch as the aldol reaction is an equilibrium one. Preferred as solvents are the low boiling anhydrous aromatic hydrocarbons, such as benzene and xylene. C-ring closure occurs regardless of the nature of the substitution on the aromatic ring. When the aromatic ring contains an activating substituent, conditions which would also close the B-ring, e.g., strong acid, are avoided.

The reduction of the 8(14) unsaturation in the tricyclic compounds is carried out by catalytic hydrogenation either at room temperature or above. It is found that when hydrogen and a palladium-on-charcoal catalyst are used, the hydrogen introduced at the carbon 14-position is principally in the configuration trans to the group attached at the 13-position. By whatever mechanism the hydrogen at the 8-position is introduced, it can on treatment with an acid or base take up the most stable configuration, i.e., the position trans to the other newly introduced hydrogen, by equilibrating through keto-enol tautomerism with the adjacent keto group. Thus the second hydrogen atom can be made to take up the $\beta$-configuration when the first is $\alpha$.

The configuration of the hydrogen atom introduced by palladium hydrogenation at the 14-carbon has been independently proved by reducing the keto group of Compound XXXVI

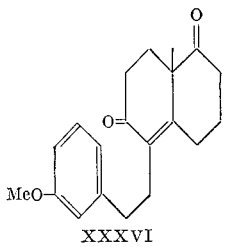

XXXVI at the 17a-position (steroid enumeration) using sodium borohydride, a method selective for that position while leaving the other keto group untouched, and then reducing the resulting keto-alcohol (XXXVII)

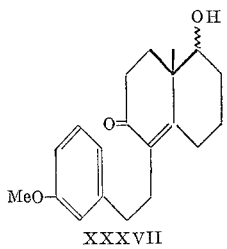

XXXVII with lithium in liquid ammonia, a method stereospecific for the introduction of a hydrogen at $C_{14}$ trans to the angular substituent at $C_{13}$ in XXXVIII

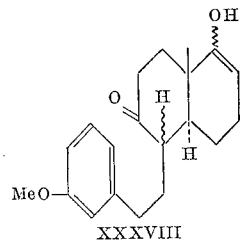

XXXVIII followed by oxidation of the reduced keto-alcohol using chromium trioxide in an organic medium to give a crystalline diketone (XXXIX)

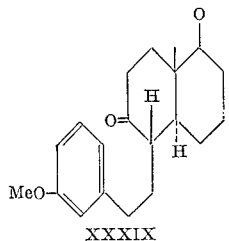

XXXIX which is converted by methanolic hydrochloric acid to the tetracyclic ketone (XL)

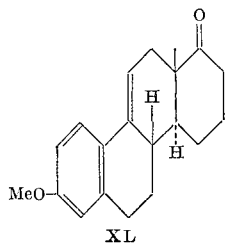

XL whose structure was determined by reduction of the 9(11) double bond and conversion to the known benzylidene derivative.

The B-ring closure is brought about under acidic conditions. Suitable are strong acids such as sulfuric, hydrochloric, p-toluene sulfonic, etc. in solvents such as benzene, toluene, anhydrous alcohol, etc. The reaction is generally carried out at room temperature or below since heat may promote the formation of an aromatic B-ring. The preferred treatment is with methanolic hydrochloric acid at room temperature. As hereinbefore noted, it has been found that the ease of B-ring closure of the compounds of the invention to form tetracyclic compounds is affected by the nature of the substituent present on the preformed aromatic A-ring, and that subsequent cyclization is easier to carry out when the preformed aromatic A-ring contains a substituent which activates the position at which cyclization is to occur. Where a compound is to be used directly for B-ring closure, it will in practice be one containing such a substituent. Those substituents which cause subsequent B-ring closure to occur readily are substituents para to the position of ring closure which are groups that in electrophilic aromatic substitution activate an aromatic ring and are predominantly o- and p-directing; for example, the hydroxy or alkoxy group.

The cyclodehydration to form a gonapentaene is brought about by treating a compound typified by Compound IX with polyphosphoric acid at room temperature or slightly above until ring closure is complete.

Saturation at the 8- or at the 9(11)-position of the tetracyclic structures must be stereospecific to obtain the natural type of exocyclic substituent configuration as noted supra. Such a sufficiently stereospecific reduction can be in general effected by the action of an alkali metal (sodium, potassium, or lithium) in liquid ammonia to give the normal steroid configuration hydrogen at the respective carbons. Preferably this type of reduction is carried out in the presence of a primary or secondary aromatic amine, for instance aniline, p-toluidine, or diphenylamine, as this can improve the yield of the desired product. The reduction can also be carried out in the presence of a more reactive proton donor: in this instance, the reduction of the ethylenic linkage occurs with a simultaneous reduction of the aromatic ring to give a 1,4-dihydrophenyl group.

The reduction of 9-dehydro compounds can also be effected by catalytic hydrogenation, as this has been discovered to be sufficiently stereospecific for production of the desired trans-anti-trans compounds of normal configuration.

The following preparations illustrate the manner of making the chemical compounds which are the starting materials for use in the processes of the invention.

PREPARATION 1

3-(3-methoxyphenyl)-n-propyl bromide

Cool 3-(3-methoxyphenyl) propan-1-ol (125 g.) in benzene (200 cc.) to 0° and add a solution of phosphorus tribromide (86 g.) in benzene (150 cc.) dropwise so that the temperature of the mixture does not rise above 5°. Keep the mixture at 0° for 1 hour, and then heat at 60° for 3 hours. Cool, pour onto ice, dilute with ether and separate the organic layer. Wash the organic solution with 3 N aqueous sodium hydroxide, water and dry. Remove the solvent and distill the residue to obtain the title compound (131 g.) B.P. 146–148°/17 mm. $n_D^{18}$ 1.5497.

$C_{10}H_{13}BrO$.—Calculated: C, 52.4; H, 5.7; Br, 34.8. Found: C, 54.4; H, 5.7; Br, 34.7.

PREPARATION 2

5-m-methoxyphenylpent-1-yne

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distill to obtain 5-m-methoxyphenylpent-1-yne (7.1 gr., 66%), B.P. 75–78° C./ 0.06 mm. Hg.

$C_{12}H_{14}O$, percent.—Calculated: C, 82.7; H, 8.1. Found: C, 82.2; H, 7.8.

PREPARATION 3

1-diethylamino-6-m-methoxyphenylhex-2-yne

Allow 5-m-methoxyphenylpent-1-yne (8 g.) to stand for 12 hours at 70° under nitrogen with water (2.5 cc.), trioxan (0.5 g.), 30% Formalin (5.5 g), diethylamine (4 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid: wash the acid extract with ether, make alkaline with 10% aqueous sodium hydroxide, extract with ether, and then wash and dry the ether extract. Distill to obtain 1-diethylamino-6-m-methoxyphenylhex-2-yne (10.6 g., 88%), B.P. 130–131° C./0.1 mm.

$C_{17}H_{25}N$, percent.—Calculated: C, 78.7; H, 9.7. Found: C, 78.9; H, 9.6.

PREPARATION 4

1-diethylamino-6-m-methoxyphenylhexan-3-one and 6-m-methoxyphenylhex-1-en-3-one Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1-diethylamino-6-m-methoxyphenyl-hexan-3-one, infrared absorption peak at $1710\mu$. Distill under reduced pressure with partial elimination of diethylamine, to obtain a mixture of the ketoamine 1-diethyl-amino-6-m-methoxyphenyl-hexan-3-one and the vinyl ketone 6-m-methoxyphenylhex-1-en-3-one (7.1 g., ca. 76%), B.P. 140–145° C./0.1 mm.; infrared absorption peaks at 5.85, and $5.95\mu$, the ketoamine predominating.

Distill a second portion of the crude ketoamine 1-diethylamino-6-m-methoxyphenylhexan-3-one very slowly over a period of 30 minutes through a Vigreux fractionating column 10 cm. high and 1 in. diameter under reduced pressure to eliminate most of the diethylamine. Dissolve the 6-m-methoxyphenylhex-1-en-3-one obtained (B.P. 114° C./0.7 mm.) in ether and wash the ether solution with dilute hydrochloric acid, followed by aqueous sodium bicarbonate and water. Dry and evaporate. Distill the residue to give the pure vinyl ketone as a colorless liquid, B.P. 76° C./0.3 mm.

$C_{13}H_{16}O_2$ percent.—Calculated: C, 76.4; H, 7.9. Found: C. 76.3; H, 8.0.

Mix a third portion of the crude undistilled 1-diethyl-amino-6-m-methoxyphenylhexan-3-one (3 g.) with methyl iodide (3 g.). An exothermic reaction soon develops. After 12 hours wash the mixture with ether to remove unchanged reactants and subject to reduced pressure (15 min.) to remove ether remaining: the residue is the crude methiodide of the ketoamine (4.6 g.).

Infrared absorption peaks at $5.85\mu$.

This compound is useful for preparing the novel compositions of this invention which have hormonal activity.

PREPARATION 5

2-ethyl-cyclopentane-1,3-dione

Dissolve 2-ethylcyclopentane-1,3,4-trione hydrate (30 g., M.P. 65–69°, Koenigs and Hopmann, Ber., 1921, 54, 1343) in ethanol (200 cc.) and water (100 cc.). To this solution add dropwise during 1 hour a solution of semicarbazide hydrochloride (21 g.) and sodium acetate (28.2 g.) in water (200 cc.) with vigorous stirring throughout. Filter off the semicarbazone precipitated, wash with methanol, and purify by stirring in refluxing methanol; filter to obtain a pale cream powder, M.P. 179–82°.

Dissolve the semicarbazone (34 g.) in a solution of potassium hydroxide (34 g.) in dry ethylene glycol at 130°, and heat the mixture to 160° for 1 hour, followed by 30 minutes at 180°. Distill the glycol at 0.01 mm.; dissolve the residual solid in water (150 cc.) and make the solution acid to Congo red with hydrochloric acid. Cool to 0° overnight and filter. Recrystallize the residue from water to obtain 2-ethylcyclopentane-1,3-dione (10 g.), M.P. 180° with sublimation.

This compound is useful for preparing the novel compositions of this invention which have hormonal activity.

PREPARATION 6

2-(6-m-methoxyphenyl-3-oxyhexyl)-2 - ethylcyclopentane-1,3-dione

Reflux a mixture (5.25 g.) of 1-diethylamino-6-m-methoxyphenylhexan-3-one and 6-m-methoxyphenylhex-1-en-3-one with 2-ethyl-cyclopentane-1,3-dione (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain as residue the triketone 2-(6-m-methoxyphenyl-3-oxohexyl)-2-ethylcyclopentane-1,3-dione (7.1 g.) as a gum.

This compound is useful as an intermediate for the preparation of the novel compositions of this invention which have hormonal activity.

The following examples illustrate the manner of using the claimed processes of the invention for the preparation of the claimed compositions of the invention, and for the preparation of natural steroids.

EXAMPLE 1

5-m-methoxyphenethyl-9-methyl-$\Delta^{5(10)}$-octalin-1,6 - dione

Reflux 2-(6-m-methoxyphenyl-3-oxohexyl)-2 - methyl-cyclohexane-1,3-dione (8.2 g.) in xylene for 24 hours with benzoic acid (3.5 g.) and triethylamine (2.9 cc.) using a Dean-Stark water trap. Dilute the cooled solution with ether, wash and dry. Distill the product to obain the diketone 5-(m - methoxyphenethyl) - 9 - methyl - $\Delta^{5(10)}$-octalin-1,6-dione as a viscous oil (6.5 g.); ultraviolet absorption peak at 251 $\mu$ ($\epsilon$ 10,000).

To prepare 5-m-methoxyphenethyl-9-ethyl$\Delta^{5(10)}$-octalin-1,6-dione, treat 2-(6-m-methoxyphenyl-3-oxohexyl)-2-methylcyclohexane-1,3-dione with benzoic acid and triethylamine according to the manipulative procedure described above.

To prepare 5,6,7,8-tetrahydro-4-m-methoxyphenethyl-8-isopropylindane-1,5-dione, treat 2-(6-m-methoxyphenyl-3-oxohexyl)-2-isopropylcyclopentane-1,3-dione with benzoic acid and triethylamine according to the manipulative procedure described above.

To prepare 5,6,7,8-tetrahydro-4-m-methoxyphenethyl-8-isobutylindane-1,5-dione, treat 2-(6-m-methoxyphenyl-3-oxohexyl)-2-isobutylcyclopentane-1,3-dione with benzoic acid and triethylamine according to the manipulative procedure described above.

To prepare 5,6,7,8-tetrahydro-4-m-methoxyphenethyl-8-cetylindane-1,5-dione, treat 2-(6-m-methoxyphenyl-3-oxohexyl)-2-cetylcyclopentane-1,3-dione with benzoic acid and triethylamine according to the manipulative procedure described above.

To prepare 5,6,7,8 - tetrahydro-4-m-methoxyphenyl-propyl-8-methylindane-1,5-dione, treat 2-(7-m-methoxyphenyl-3-oxoheptyl)-2-methylcyclopentane-1,3-dione with benzoic acid and triethylamine according to the manipulative procedure described above.

To prepare 5,6,7,8-tetrahydro-4-($\alpha$-methyl-m-methoxy-phenethyl)-8-methylindane - 1,5- dione, treat 2-(6-m-methoxyphenyl-3-oxo-5-methylhexyl) - 2 - methylcyclo-pentane-1,3-dione with benzoic acid and triethylamine according to the manipulative procedure described above.

To prepare 5,6,7,8-tetrahydro-4-m-hydroxyphenethyl-8-methylindane-1,5-dione, treat 2-(6-m-hydroxyphenyl-3-oxohexyl)-2-methylcyclopentane-1,3-dione with benzoic acid and triethylamine according to the manipulative procedure described above.

To prepare 5,6,7,8-tetrahydro-4-m-hydroxyphenethyl-8-n-propylindane-1,5-dione, treat 2-(6-m-hydroxyphenyl- 3-oxohexyl)-2-propylcyclopentane-1,3-dione with benzoic acid and triethylamine according to the manipulative procedure described above.

To prepare 5,6,7,8-tetrahydro-4-(3,4-dimethoxyphenethyl)-8-ethylindane-1,5-dione, treat 2[6-(3,4-dimethoxyphenyl)-3-oxohexyl]-2-ethylcyclopentane-1,3-dione with benzoic acid and triethylamine according to the manipulative procedure described above.

To prepare 5,6,7,8-tetrahydro-4-m-methoxyphenethyl-8-hydroxypropylindane-1,5-dione, treat 2-(6-m-methoxyphenyl-3-oxohexyl - 2 - hydroxypropylcyclopentane - 1,3-dione with benzoic acid and triethylamine according to the manipulative procedure described above.

To prepare 5,6,7,8-tetrahydro-4-m-ethoxyphenethyl-8-ethylindane-1,5-dione, treat 2-(6-m-ethoxyphenyl-3-oxohexyl)-2-ethylcyclopentane-1,3-dione with benzoic acid and triethylamine according to the manipulative procedure described above.

To prepare 5,6,7,8-tetrahydro-4-m-n-propoxyphenethyl-8-phenethylindane-1,5-dione, treat 2 - (6 - m - propoxyphenyl-3-oxohexyl)-2 - phenethylcyclopentane - 1,3-dione with benzoic acid and triethylamine according to the manipulative procedure described above.

To prepare 5,6,7,8-tetrahydro-4-m-pentyloxyphenethyl-8-isobutylindane-1,5-dione, treat 2-(6-m-pentyloxyphenyl-3-oxohexyl)-2 - isobutylcyclopentane - 1,3 - dione with benzoic acid and triethylamine according to the manipulative procedure described above.

To prepare 5,6,7,8-tetrahydro - 4 - m-cyclopentyloxyphenethyl-8-hydroxypropylindane-1,5-dione, treat 2-(6-m-cyclopentyloxyphenyl-3-oxohexyl) - 2 - hydroxypropylcyclopentane-1,3-dione with benzoic acid and triethylamine according to the manipulative procedure described above.

To prepare 5,6,7,8-tetrahydro-4-m-hydroxyphenethyl-8-phenethylindane-1,5-dione, treat 2-(6-m-hydroxyphenyl-3-oxohexyl)-2-phenethylcyclopentane-1,3-dione with benzoic acid and triethylamine according to the manipulative procedure described above.

To prepare 5,6,7,8-tetrahydro-4(3,4-dimethoxyphenethyl)-8-diethylaminoethylindane-1,5-dione, treat 2-[6-(3,4-dimethoxyphenyl)-3-oxohexyl] - 2 - diethylaminoethylcyclopentane-1,3-dione with benzoic acid and triethylamine according to the manipulative procedure described above.

To prepare 5,6,7,8-tetrahydro-4[2 - (3,5 - dimethoxyphenyl)propyl]-8-dimethylaminoethylindane - 1,5 - dione, treat 2-[6-(3,5-dimethoxyphenyl)-3-oxoheptyl] - 2 - dimethylaminoethylcyclopentane - 1,3 - dione with benzoic acid and triethylamine according to the manipulative procedure described above.

To prepare 5,6,7,8-tetrahydro-4 - [2 - (3,5 - diethoxyphenyl)butyl]-8-n-butylindane-1,5-dione, treat 2-[6-(3,5-diethoxyphenyl)-3-oxocetyl]-2 - butylcyclopentane - 1,3-dione with benzoic acid and triethylamine according to the manipulative procedure described above.

To prepare 5,6,7,8-tetrahydro-4-(3-methoxy-4-ethoxyphenethyl)-8-n-propylindane-1,5-dione, treat 2 - [6 - (3-methoxy-4-ethoxyphenyl)-3-oxohexyl] - 2 - propylcyclopentane-1,3-dione with benzoic acid and triethylamine according to the manipulative procedure described above.

To prepare 5,6,7,8-tetrahydro-4-m-acetoxyphenethyl-8-ethylindane-1,5-dione, treat 2-(6-m-acetoxyphenyl - 3-oxohexyl)-2-ethylcyclopentane - 1,3 - dione with benzoic acid and triethylamine according to the manipulative procedure described above.

These compounds are useful as intermediates for preparing the novel compositions of this invention which have hormonal activity.

EXAMPLE 2

5,6,7,8-tetrahydro-4(m-methoxyphenethyl)-8-methylindane-1,5-dione

To 2 - (6 - m - methoxyphenyl) - 3 - oxohexyl) - 2-methylcyclopentane-1,3-dione (16.5 g.) in xylene (20 cc.), add benzoic acid (7.1 g.) and triethylamine (5.9 cc.). Reflux the mixture for 6 days using a Dean-Stark water trap, then cool. Add ether and wash the solution, then dry and evaporate. Take up the resulting gum in a mixture of light petroleum and benzene and chromatograph on neutral alumina. Elute with a benzene-ether mixture to obtain the ethylenic diketone 5,6,7,8-tetrahydro-4(m-methoxyphenethyl)-8-methylindane-1,5-dione (12.5 g., 59%); ultraviolet absorption peak at 248 m$\mu$ ($\epsilon$ 8,500).

This compound is useful as an intermediate for preparing the novel compositions of this invention which have hormonal activity.

EXAMPLE 3

5,6,7,8-tetrahydro-4-(m-methoxyphenethyl)-8-methylindane-1,5-dione

Treat 2 - (6 - m - methoxyphenyl - 3 - oxohexyl) - 2-methylcyclopentane-1,3-dione (0.74 g.) as in the previous example but using xylene (20 cc.) and aluminum tert-butoxide (0.50 g.). Work up the product with ether and chromatograph as before. Elute the column with ether containing a small proportion of benzene to obtain the ethylenic diketone (0.11 g., 15%). Infrared absorption peaks at 5.75 and 6.02$\mu$; elute further with ether containing methanol to obtain the aldo (0.05 g., 7%); infrared absorption peaks at 2.94, 5.75, 5.85, 6.25$\mu$.

This compound is useful as an intermediate for preparing the novel compositions of this invention which have hormonal activity.

EXAMPLE 4

5,6,7,8-tetrahydro-4-(m-methoxyphenethyl)-8-methylindane-1,5-dione

Add 5,6,7,8-tetrahydro-8-methylindane-1,5-dione (5.5 g.) (Panouse and Sannie, Bull. Soc. Chim., France, 1955, 1036; Boyce and Whitehurst, J. Chem. Soc., 1959, 2022) in benzene (30 cc.) with vigorous stirring to potassium tert-butoxide (from the metal, 1.45 g.) in benzene (150 cc.) under dry nitrogen. Remove the benzene-tert-butanol azeotrope using a Fenske fractionating column with variable take-off head. Cool the residual benzene solution of the potassium enolate to room temperature and add m-methoxyphenethyl bromide (8 g.) (Collins and Smith, J. Chem. Soc., 1956, 4308) in benzene (50 cc.) dropwise over 15 minutes, after which stir the mixture for 1 hour, then reflux for a further hour. Work up the product with ether and evaporate the ether extract to obtain a gum. Distill to yield fraction A (5 g.), B.P. 60–150°/0.05 mm. and fraction B (2.1 g.), B.P. 160–90°/0.05 mm. Fraction B is the diketone 5,6,7,8-tetrahydro-4(m-methoxyphenethyl)-8-methylindane-1,5-dione, a viscous oil containing some impurity; ultraviolet absorption peak at 245 m$\mu$ ($\epsilon$ 8,300); infrared absorption peaks at 5.75, 6.02, 6.23, 6.29, 12.82, 14.33$\mu$.

This compound is useful as an intermediate for preparing the novel compositions of this invention which have hormonal activity.

EXAMPLE 5

8-ethyl-5,6,7,8-tetrahydro-4-(m-methoxyphenethyl)-indane-1,5-dione

Reflux 2 - ethyl-2(6-m-methoxyphenyl - 3 - oxohexyl) cyclopentane-1,3-dione (15 g.) in xylene (120 cc.) with benzoic acid (7.1 g.) and triethylamine (5.9 cc.) using a Dean-Stark water separator for 14 days. Add ether and wash the cooled solution free from benzoic acid with sodium carbonate solution. Dry the solution and evaporate to a brown gum. Distill at 220° (0.01 mm. Hg) to obtain 8-ethyl-5,6,7,8-tetrahydro - 4 - (m-methoxyphenethyl)-indane-1,5-dione as a yellow gum; ultraviolet absortion peak at 247 m$\mu$ ($\epsilon$ 8,400); infrared absorption peaks at 5.76 and 6.03$\mu$.

This compound is useful as an intermediate for preparing novel compositions of this invention which have hormonal activity.

EXAMPLE 6

9-methyl-5-phenylethyl-$\Delta^{5(10)}$-octalin-1,6-dione

Reflux the crude triketone 2-(6-phenyl-3-oxohexyl)-2-methylcyclohexane-1,3-dione (28 g.) for 24 hours in xylene (162 cc.) with a mixture of triethylamine (9.9 cc.) and benzoic acid (11.95 g.) using a Dean-Stark water separator. Dilute the cooled solution with ether, wash and dry. Distill the product to obtain the diketone 9-methyl-5-phenethyl-$\Delta^{5(10)}$-octalin-1,6-dione as a viscous oil (15 g.), B.P. 184°/0.05 mm.; ultraviolet absorption peak at 253 m$\mu$ ($\epsilon$ 9,500).

This compound is useful as an intermediate for preparing the novel compositions of this invention which have hormonal activity.

EXAMPLE 7

5,6,7,8-tetrahydro-4-phenethyl-8-methylindane-1,5-dione

Dissolve the Michael adduct 2-(6-phenyl-3-oxohexyl)-2-methylcyclopentane-1,3-dione (3.8 g.), benzoic acid (1.9 g.) and triethylamine (1.66 cc.) in xylene (30 cc.) and reflux for 72 hours using a Dean-Stark water trap. Dilute the cooled solution with ether, wash with water, followed by acid, and dry. Evaporate the ether to obtain as residue a gum which is taken up in light petroleum (10 cc.) and chromatograph the solution on neutral alumina. Recover three fractions: vinyl ketone from the reversal of the Michael condensation, to be eluted with light petroleum and benzene; and a third fraction to be eluted with benzene. The second fraction is the desired ethylenic diketone, 5,6,7,8-tetrahydro - 4 - phenethyl-8-methylindane-1,5-dione, a viscous oil (1.2 g., 32%); ultraviolet absorption peak at 249 m$\mu$ ($\epsilon$ 9,650); infrared absorption peaks at 5.75, 13.46$\mu$.

This compound is useful as an intermediate for preparing the novel compositions of this invention which have hormonal activity.

EXAMPLE 8

5,6,7,8-tetrahydro-4-phenethyl-8-methylindane-1,5-dione

Reflux 2-(6-phenyl-3-oxohexyl)-2-methylcyclopentane-1,3-dione (5.0 g.) in benzene (20 cc.) and toluene-p-sulphonic acid (0.16 g.) using a Dean-Stark water separator. After 2 hours add a second quantity of the acid (0.16 g.) and continue the refluxing until the theoretical amount of water for a single dehydration has been collected. Dilute the cooled reaction mixture with ether and wash and dry the solution. Remove the solvent by evaporation to obtain a gum which one then distills to obtain 5,6,7,8-tetrahydro-4-phenethyl-8-methylindane-1,5 - dione, B.P. 145–50°/0.5 mm., as a pale yellow gum (5 g., 87%); ultraviolet absorption peak at 249 m$\mu$ ($\epsilon$ 9,900). Infrared absorption peaks at 5.75 and 6.02$\mu$.

This compound is useful as an intermediate for preparing the novel compositions of this invention which have hormonal activity.

EXAMPLE 9

8-methyl-4-m-nitrophenethyl-5,6,7,8-tetrahydroindane-1,5-dione

Reflux 2-methyl-2-(6-m-nitrophenyl-3-oxohexyl)cyclopentane-1,3-dione (1 g.) with toluene-p-sulphonic acid (0.1 g.) in dry benzene (35 cc.) for 4 hours, using a Dean-Stark water separator. Cool the mixture and dilute with a little ether; wash and dry. Evaporate the solvent to obtain as residue a gum (0.82 g.) which readily crystallizes: recrystallize from ethanol to obtain the ethylenic diketone 8-methyl-4-m-nitrophenethyl) - 5,6,7,8-tetrahydroindane-1,5-dione, M.P. 101–3°; infrared absorption peaks at 5.75, 6.02, 6.54, 7.35$\mu$; ultraviolet absorption peak (in ethanol) at 252 m$\mu$ ($\epsilon$ 18,000).

This compound is useful as an intermediate for preparing the novel compositions of this invention which have hormonal activity.

EXAMPLE 10

4-m-aminophenethyl-8-methyl-5,6,7,8-tetrahydroindane-1,5-dione

Hydrogenate the crude nitro ethylenic diketone product of the previous example (0.155 g.) in ethanol (30 cc.) at atmospheric pressure using 10% palladized charcoal (0.09 g.) as catalyst. Hydrogen uptake will cease when the equivalent of 3 molecules of hydrogen (43 cc.) has been absorbed. Filter and evaporate to obtain as residue the amino ethylenic diketone 4(m-aminophenethyl)-8-methyl-5,6,7,8-tetrahydroindane-1,5-dione as a gum; infrared absorption peaks at 2.87 and 2.95$\mu$ (primary amino group); 5.78 $\mu$ (carbonyl in pentane ring); 6.05$\mu$ ($\alpha,\beta$-unsaturated carbonyl).

This compound is useful as an intermediate for preparing the novel compositions of this invention which have hormonal activity.

EXAMPLE 11

4-m-acetamidophenethyl)-8-methyl-5,6,7,8-tetrahydroindane-1,5-dione

Mix the amino ethylenic diketone product of the previous example (0.1 g.) with acetic anhydride (0.25 cc.) and pyridine (3 cc.) and allow to stand for 15 hours. Add ethanol to decompose excess anhydride, and remove the total solvents under reduced pressure to obtain as residue a gum which is 4-m-acetamidophenethyl-8-methyl-5,6,7,8-tetrahydroindane - 1,5 - dione by its infrared absorption (liquid film); infrared absorption peaks at 2.99–3.00$\mu$ (bonded NH); 5.78$\mu$ (carbonyl in pentane ring); 6.02–6.06$\mu$ ($\alpha,\beta$-unsaturated carbonyl and first amide band); and 6.45$\mu$ (second amide band).

This compound is useful as an intermediate for preparing the novel compositions of this invention which have hormonal activity.

EXAMPLE 12

4-m-hydroxyphenethyl-8-ethyl-5,6,7,8 - tetrahydroindane-1,5-dione

Reflux the triketone 2-(6-m-hydroxyphenyl-3-oxohexyl)-2-ethylcyclopentane-1,3-dione (5 g.) in xylene (40 cc.) with benzoic acid (1.4 g.) and triethylamine (1.2 cc.) for 10 days with continuous water separation. Dilute the cooled solution with ether and wash free from benzoic acid with saturated aqueous potassium bicarbonate, then with water and dry. Evaporate the solvent and take up the residual gum in benzene and chromatograph on silica gel (150 g.). Elute with benzene-ether to obtain 4-m-hydroxyphenethyl-8-ethyl-5,6,7,8-tetrahydroindane-1,5-dione as a gum; ultraviolet absorption peak at 250m$\mu$ ($\epsilon$ 9,000); infrared absorption peaks at 5.75 and 6.02$\mu$.

This compound is useful as an intermediate for preparing the novel compositions of this invention which have hormonal activity.

EXAMPLE 13

5-m-methoxyphenethyl-9-methyl-6-oxo - $\Delta^{5(10)}$ - octalin - 1-ol

Add sodium borohydride (0.55 g.) in ethanol (80 cc.) to 5 - m - methoxyphenethyl-9-methyl-$\Delta^{5(10)}$-octalin-1,6-dione (3 g.) in ethanol (80 cc.) at 8° C. After 12 minutes add an excess of acetic acid and evaporate the solution to dryness under reduced pressure. Add water (75 cc.) and extract the product with ether. Wash, dry and evaporate the ethereal solution.

Recrystallize the product from ether to obtain the keto alcohol, 5 - m - methoxyphenethyl-9-methyl-6-oxo-$\Delta^{5(10)}$-octalin-1-ol (2.0 g., 66%), M.P. 96–97° C.

$C_{20}H_{26}O_3$, percent.—Calculated: C, 76.4; H, 8.35. Found: C, 76.2; H, 8.2.

This compound is useful as an intermediate for preparing the novel compositions of this invention which have hormonal activity.

EXAMPLE 14

5,6,7,8-tetrahydro-4-m-methoxyphenethyl-8-methyl-5-oxoindane-1-ol

To the ethylenic diketone, 5,6,7,8-tetrahydro-4-m-methoxyphenethyl-8-methylindane-1,5-dione (12.35 g.) in ethanol (500 cc.) at 0° C. add sodium borohydride (1 g.) in ethanol (50 cc.) over 20 minutes. Allow the mixture to warm to room temperature and then stir for 12 minutes. Add a slight excess of acetic acid and evaporate the solvent under reduced pressure. Treat the residue with water (60 cc.) and ether extract. Wash, dry and evaporate the extracts to obtain a glassy residue which crystallizes on cooling and scratching. Recrystallize the ethylenic keto alcohol, 5,6,7,8-tetrahydro-4-m-methoxyphenethyl-8-methyl-5-oxoindane-1-ol (9.4 g.) from a mixture of light petroleum and diisopropyl ether, M.P. 88–90° C.; infrared absorption peaks at 2.94 and 6.02μ.

$C_{19}H_{24}O_3$, percent.—Calculated: C, 76.0; H, 8.05. Found: C, 75.7; H, 8.0.

To prepare 4-m-methoxyphenethyl-8-isopropyl-5-oxo-5,6,7,8 - tetrahydroindane-1-ol, treat 4-m-methoxyphenethyl-8-iospropyl-5,6,7,8-tetrahydroindane-1,5-dione with sodium borohydride according to the manipulative procedure described above.

To prepare 4 - m - methoxyphenethyl-8-cetyl-5-oxo-5,6,7,8 - tetrahydroindane-1-ol, treat 4-m-methoxyphenethyl-8-cetyl-5,6,7,8-tetrahydroindane - 1,5 - dione with borohydride according to the manipulative procedure described above.

To prepare 4 - (2-m-methoxyphenylpropyl)-8-methyl-5-oxo-5,6,7,8-tetrahydroindane - 1 - ol, treat 4-(2-m-methoxyphenylpropyl) - 8-methyl-5,6,7,8-tetrarydroindane-1,5-dione with sodium borohydride according to the manipulative procedure described above.

To prepare 4-m-hydroxyphenethyl - 8 - methyl-5-oxo-5,6,7,8 - tetrahydroindane-1-ol, treat 4-m-hydroxyphenethyl-8-methyl - 5,6,7,8 - tetrahydroindane-1,5-dione with sodium borohydride according to the manipulative procedure described above.

To prepare 4-(3,4-dimethoxyphenethyl)-8-ethyl-5-oxo-5,6,7,8-tetrahydroindane - 1 - ol, treat 4-(3,4-dimethoxyphenethyl) - 8 - ethyl-5,6,7,8-tetrahydroindane-1,5-dione with sodium borohydride according to the manipulative procedure described above.

To prepare 4-m-ethoxyphenethyl-8-ethyl-5-oxo-5,6,7,8-tetrahydroindane-1-ol, treat 4-m-ethoxyphenethyl-8-ethyl-5,6,7,8-tetrahydroindane-1,5-dione with sodium borohydride according to the manipulative procedure described above.

To prepare 4-m-n-pentyloxyphenethyl-8-isobutyl-5-oxo-5,6,7,8-tetrahydroindane-1-ol, treat 4-m-n-pentyloxyphenethyl - 8 - isobutyl-5,6,7,8-tetrahydroindane-1,5-dione with sodium borohydride according to the manipulative procedure described above.

To prepare 4 - (3,5-dimethoxyphenethyl)-8-dimethylaminopropyl-5-oxo-5,6,7,8-tetrahydroindane - 1 - ol, treat 4-(3,5-dimethoxyphenethyl) - 8 - dimethylaminopropyl-5,6,7,8-tetrahydroindane-1,5-dione with sodium borohydride according to the manipulative procedure described above.

These compounds are useful as intermediates for preparing the novel compositions of this invention which have hormonal activity.

EXAMPLE 15

4-m-methoxyphenethyl-8-methyl-5,6,7,8-tetrahydro-1-methoxyindan-5-one

Treat 4 - m-methoxyphenethyl-8-methyl-5-oxo-5,6,7,8-tetrahydroindan-1-ol (1 g.) in methylene chloride (50 cc.) containing 1 drop of boron trifluoride etherate with a solution of diazomethane (from N-nitrosomethylurea 2 g.) in methylene chloride (40 cc.). Stir the mixture for 5 minutes and then decompose the excess diazomethane by the addition of acetic acid. Wash, dry and evaporate the solution and chromatograph the residue on alumina (30 g.) to obtain 4-m-methoxyphenethyl-8-methyl-1-methoxy-5,6,7,8-tetrahydroindan-5-one; ultraviolet absorption peak at 249 mμ (ε 9,500).

This compound is useful as an intermediate for preparing the novel compositions of this invention which have hormonal activity.

EXAMPLE 16

1,1-ethylenedioxy-4-m - methoxyphenethyl - 8 - methyl-5,6,7,8-tetrahydroindan-5-one Reflux the diketone 4-m-methoxyphenethyl-8-methyl-5,6,7,8,-tetrahydroindan-1,5-dione (1.15 g.) in benzene (26 cc.) and ethylene glycol (0.25 cc.) and toluene-p-sulphonic acid (0.11 g.) using a Dean-Stark trap to remove water and remove the solvent from the cooled reaction mixture to give a pale yellow gum (1 g.). Dissolve in light petroleum and chromatograph the solution on neutral alumina. Carry out the elution first with mixtures of petroleum and benzene and subsequently with benzene: this latter solvent elutes the required ketal 1,1-ethylenedioxy-4-m-methoxyphenethyl-8-methyl - 5,6,7,8 - tetrahydroindan-5-one (0.6 g.); infrared absorption peaks at 6.02, 6.25, 12.82 and 14.29 μ.

This compound is useful as an intermediate for preparing the novel compositions of this invention which have hormonal activity.

To prepare 1,1-ethylenedioxy-4-m-methoxyphenethyl-8 - isobutyl-5,6,7,8-tetrahydroindan-5-one, treat 4-m-methoxyphenethyl - 8-isobutyl-5,6,7,8-tetrahydroindane-1,5-dione with ethylene glycol and toluene-p-sulphonic acid according to the manipulative procedure described above.

To prepare 1,1-ethylenedioxy-4-(α-methyl-m-methoxyphenethyl)-8-methyl-5,6,7,8-tetrahydroindan-5-one, treat 4-(α-methyl-m-methoxyphenethyl)-8-methyl-5,6,7,8 - tetrahydroindane-1,5-dione with ethylene glycol and toluene-p-sulphonic acid according to the manipulative procedure described above.

To prepare 1,1 - ethylenedioxy-4-m-nitrophenethyl-8-methyl-5,6,7,8-tetrahydroindan-5-one, treat, 4 - m - nitrophenethyl-8-methyl-5,6,7,8-tetrahydroindane - 1,5 - dione with ethylene glycol and toluene-p-sulphonic acid according to the manipulative procedure described above.

To prepare, 1,1-ethylenedioxy-4-m-hydroxyphenethyl-8-propyl-5,6,7,8-tetrahydroindan-5-one, treat 4-m-hydroxyphenethyl-8-propyl-5,6,7,8-tetrahydroindane - 1,5 - dione with ethylene glycol and toluene-p-sulphonic acid according to the manipulative procedure described above.

To prepare 1,1 - ethylenedioxy-4-(3,5-dimethoxyphenethyl)-8-ethyl-5,6,7,8-tetrahydroindan-5-one, treat 4-(3,5-dimethoxyphenethyl) - 8 - ethyl-5,6,7,8-tetrahydroindane 1,5-dione with ethylene glycol and toluene p-sulphonic acid according to the manipulative procedure described above.

To prepare 1,1-ethylenedioxy-4-m-propoxyphenethyl-8-phenethyl - 5,6,7,8-tetrahydroindan-5-one, treat 4-m-propoxyphenethyl - 8-phenethyl-5,6,7,8-tetrahydroindane-1,5-dione with ethylene glycol and toluene-p-sulphonic acid according to the manipulative procedure described above.

To prepare 1,1-ethylenedioxy-4-m-cyclopentyloxyphenethyl - 8 - hydroxypropyl-5,6,7,8-tetrahydroindan-5-one, treat 4 - m-cyclopentyloxyphenethyl-8-hydroxypropyl-5,6,7,8-tetrahydroindane-1,5-dione with ethylene glycol and toluene-p-sulphonic acid according to the manipulative procedure described above.

These compounds are useful as intermediates for preparing the novel compositions of this invention which have hormonal activity.

EXAMPLE 17

1-acetoxy-4-m-methoxyphenethyl-8-methyl-5,6,7,8-tetrahydroindane

To 4-m-methoxyphenethyl-8-methyl-5,6,7,8-tetrahydroindan-1-ol (0.45 g.) in pyridine (2 cc.) at 0° add acetic anhydride (2 cc.), and allow the mixture to stand at room temperature for 18 hours. Add water and isolate the product by means of ether. Dissolve in benzene and filter the solution through alumina; evaporate the solvent to obtain the acetate as a gum; infrared absorption peaks at 6.02 and 5.75$\mu$; ultraviolet absorption peaks at 248 m$\mu$ ($\epsilon$ 10,500).

This compound is useful as an intermediate for preparing the novel compositions of this invention which have hormonal activity.

EXAMPLE 18

1-benzoyloxy-4-m-methoxyphenethyl-8-methyl-5,6,7,8-tetrahydroindane

To 4 - m - methoxyphenethyl-8-methyl-5,6,7,8-tetrahydroindan-1-ol (0.34 g.) in pyridine (5 cc.) at 0°, add benzoyl chloride (0.5 cc.) and allow the mixture to stand at room temperature for 18 hours. After decomposition of excess benzoyl chloride with water, isolate the product by means of ether, dissolve in benzene and filter the solution through alumina; evaporate the solvent to obtain the solid benzoate (0.22 g.) which is recrystallized from methanol, M.P. 116–8°; infrared absorption peaks at 6.02, and 5.85 m$\mu$; ultraviolet absorption peaks at 229 m$\mu$ ($\epsilon$ 23,000).

To prepare 1-acetoxy-4-m-methoxyphenethyl-8-isopropyl - 5-oxo-5,6,7,8-tetrahydroindane, treat 4-m-methoxyphenethyl - 8-isopropyl-5-oxo-5,6,7,8-tetrahydroindan-1-ol with acetic anhydride according to the manipulative procedure described above.

To prepare 1 - acetoxy-4-m-methoxyphenethyl-8-cetyl 5 - oxo-5,6,7,8-tetrahydroindane, treat 4-m-methoxyphenethyl-8-cetyl - 5 - oxo - 5,6,7,8-tetrahydroindan-1-ol with acetic anhydride according to the manipulative procedure described above.

To prepare 1 - acetoxy-4-(2-m-methoxyphenylpropyl)-8 - methyl-5-oxo-5,6,7,8-tetrahydroindane, treat 4-(2-m-methoxyphenylpropyl) - 8 - methyl-5-oxo-5,6,7,8-tetrahydroindan-1-ol with acetic anhydride according to the manipulative procedure described above.

To prepare 1 - propionoxy-4-m-hydroxyphenethyl-8-methyl - 5 - oxo-5,6,7,8-tetrahydroindane, treat 4-m-hydroxyphenethyl - 8 - methyl-5-oxo-5,6,7,8-tetrahydroindan-1-ol with propionic anhydride according to the maipulative procedure described above.

To prepare 1 - propionoxy-4(3,4-dimethoxyphenethyl)-8 - ethyl-5-oxo-5,6,7,8-tetrahydroindane, treat 4-(3,4-dimethoxyphenethyl) - 8 - ethyl-5-oxo-5,6,7,8-tetrahydroinda-1-ol with propionic anhydride according to the manipulative procedure described above.

To prepare 1 - benzoyloxy-4-m-pentyloxyphenethyl-8-isobutyl - 5 - oxo-5,6,7,8-tetrahydroindane, treat 4-m-pentyloxyphenethyl - 8 - isobutyl - 5-oxo-5,6,7,8-tetrahydroindan-1-ol with benzoyl chloride according to the manipulative procedure described above.

To prepare 1 - benzoyloxy-4(3,4-dimethoxyphenethyl)-8 - ethyl-5-oxo-5,6,7,8-tetrahydroindane, treat 4-(3,4-dimethoxyphenethyl) - 8 - ethyl-5-oxo-5,6,7,8-tetrahydroindan-1-ol with benzoyl chloride according to the manipulative procedure described above.

These compounds are useful as intermediates for preparing the novel compositions of this invention which have hormonal activity.

EXAMPLE 19

4-m-methoxyphenethyl-8-ethyl-5-oxo-5,6,7,8-tetrahydroindan-1-ol

Add sodium borohydride (0.4 g. in ethanol (80 cc.) to the diketone 4-m-methoxyphenethyl)-8-ethyl-5,6,7,8-tetrahydroindane-1,5-dione (3 g.) in ethanol (80 cc.) and allow the mixture to stand at 20° for 10 minutes. Add a slight excess of acetic acid and evaporate the solution almost to dryness under reduced pressure. Add water, extract the mixture with ether and wash the ethereal solution with aqueous sodium carbonate and water and dry. Evaporate the solvent to obtain 4-m-methoxyphenethyl-8-ethyl - 5-oxo-5,6,7,8-tetrahydroindan-1-ol; infrared absorption peaks at 2.94$\mu$ and 6.01$\mu$.

This compound is useful as an intermediate for preparing the novel compositions of this invention which have hormonal activity.

EXAMPLE 20

4-m-methoxyphenethyl-8-ethyl-1-acetoxy-5-oxo-5,6,7,8-tetrahydroindane

Dissolve 4-m-methoxyphenethyl-8-ethyl - 5-oxo-5,6,7,8-tetrahydroindan-1-ol (1 g.) in pyridine (5 cc.), cool to 0° and add acetic anhydride (5 cc.). After 18 hours, add water and allow the mixture to stand for 30 minutes. Extract the product with ether, and wash the ethereal solution with water, 10% aqueous potassium hydroxide, water, 10% hydrochloric acid, and brine and dry. Evaporate the solvent to obtain a gum which one dissolves in a minimal volume of benzene and filters through neutral alumina. Evaporate the solvent to obtain 4-m-methoxyphenethyl - 8-ethyl - 1-acetoxy-5-oxo - 5,6,7,8-tetrahydroindane as a gum; ultraviolet absorption peaks at 2.48 m$\mu$ ($\epsilon$ 9,500). Infrared absorption peaks at 5.75 and 6.02$\mu$.

The compound is useful as an intermediate for preparing the novel compositions of this invention having hormonal activity.

EXAMPLE 21

1,1-ethylenedioxy-4-m-methoxyphenethyl-8-ethyl-5,6,7,8-tetrahydroindan-5-one Reflux 4-m-methoxyphenethyl - 8-ethyl - 5,6,7,8-tetrahydroindane-1,5-dione (1 g.) in benzene (25 cc.) ethylene glycol (0.25 cc.) and p-toluene sulphonic acid (0.1 g.) for 5 hours using a Dean-Stark water trap. Wash the cooled solution and evaporate. Take up the residue in a minimal amount of light petroleum and chromatograph on neutral alumina (50 g.). Elute the column with light petroleum containing increasing portions of benzene to obtain a fraction which on evaporation gives the ketoketal 1,1-ethylenedioxy - 4-m-methoxyphenethyl - 8-ethyl - 5,6,7,8-tetrahydroindan-5-one as a gum; infrared absorption peaks at 6.01 and 8.55$\mu$.

This compound is useful as an intermediate for preparing the novel compositions of this invention having hormonal activity.

EXAMPLE 22

1,1-ethylenedioxy-9-methyl-5-phenethyl-$\Delta^{5(10)}$-octalin-6-one

Reflux 9-methyl - 5-phenethyl-$\Delta^{5(10)}$-octalin - 1,6-dione (6.3 g.) in benzene (315 cc.), ethylene glycol (1.50 cc.) and toluene-p-sulphonic acid (0.63 g.) during 4 hours using a Dean-Stark trap for removal of water. Cool the solution obtained, wash, dry and evaporate to obtain a yellow gum; dissolve in light petroleum ether and chromatograph the solution on neutral alumina. Elute with light petroleum and then elute with mixtures of petroleum and benzene to obtain a fraction which on evaporation gives the ketal 1,1-ethylenedioxy - 9-methyl-5-phenethyl-$\Delta^{5(10)}$-octalin-6-one as a gum (5.05 g.); infrared absorption peaks at 6.01, 8.55, 13.33 and 14.29$\mu$.

$C_{21}H_{26}O_3$, percent.—Calculated: C, 77.3; H, 8.0. Found: C, 77.2; H, 7.9.

This compound is useful as an intermediate for preparing the novel compositions of this invention having hormonal activity.

EXAMPLE 23

1,1-ethylenedioxy-8-methyl-4-phenethyl-5,6,7,8-tetrahydroindan-5-one

Reflux the diketone 8-methyl - 4-phenethyl - 5,6,7,8-tetrahydroindane-1,5-dione (0.8 g.) in benzene (20 cc.), ethylene glycol (0.2 cc.) and toluene-p-sulphonic acid (0.85 g.) using a Dean-Stark trap to remove water. Remove the solvent from the cooled reaction mixture and dissolve the residue in light petroleum, chromatograph on fuller's earth. After elution with light petroleum, use a mixture of petroleum and benzene to elute the ketal 1,1-ethylenedioxy - 8-methyl - 4-phenethyl - 5,6,7,8-tetrahydroindan-5-one (0.54 g.); infrared absorption peaks at 6.02, 13.33, and 14.29$\mu$.

This compound is useful as an intermediate for preparing the novel compositions of this invention having hormonal activity.

EXAMPLE 24

8-methyl-4-m-nitrophenethyl-5-oxo-5,6,7,8-tetrahydroindan-1-ol

Dissolve the crude 8-methyl - 4-m-nitrophenethyl-5,6,7,8-tetrahydroindane - 1,5-dione (0.5 g.) in ethanol (45 cc.) at 18°, and add sodium borohydride (0.05 g.). Shake the mixture for 5 minutes and allow the homogeneous solution obtained to stand for a further 6 minutes, after which acidify with acetic acid and evaporate almost to dryness under reduced pressure. Then add ether (35 cc.), together with water to dissolve the inorganic salts present. Separate the organic layer, wash and dry; evaporate the solvent and recrystallize the residue from a mixture of ethyl acetate and light petroleum to obtain the ethylenic keto alcohol 8-methyl-4-m-nitrophenethyl-5-oxo - 5,6,7,8-tetrahydroindan - 1-ol (0.33 g.), M.P. 117–9°; ultraviolet absorption (in ethanol) peaks at 252 m$\mu$ ($\epsilon$ 17,060) infrared absorption peaks at 2.92, 6.06, 6.55 and 7.40$\mu$.

This compound is useful as an intermediate for preparing the novel compositions of this invention having hormonal activity.

EXAMPLE 25

4-m-aminophenethyl-8-methyl-5-oxo-5,6,7,8-tetrahydroindan-1-ol

Hydrogenate the nitro ethylenic keto alcohol product of the previous example (0.155 g.) in ethanol (30 cc.) at atmospheric pressure using 10% palladised charcoal (0.09 g.) as catalyst. Uptake of hydrogen ceases when the equivalent of 3 moles has been absorbed; filter and evaporate to obtain as residue a gum, which is 4-m-aminophenethyl-8-methyl-5-oxo-5,6,7,8-tetrahydroindan-1-ol by its infrared absorption; infrared absorption peaks at 2.95$\mu$ (a broad band indicating a free amino group); 6.10$\mu$ ($\alpha,\beta$-unsaturated carbonyl); 6.21$\mu$ (shoulder); 12.82 and 14.4$\mu$ (disubstituted aromatic nucleus).

This compound is useful as an intermediate for preparing the novel compositions of this invention having hormonal activity.

EXAMPLE 26

4-m-acetamidophenethyl-1-acetoxy-8-methyl-5-oxo-5,6,7,8-tetrahydroindane

Acetylate the amino ethylenic keto alcohol of the previous example (0.15 g.) by allowing it to stand in pyridine (5 cc.) containing acetic anhydride (1 cc.), with subsequent addition of ethanol and evaporation to dryness. The residue, uncrystallizable gum, has infrared absorption: 2.30$\mu$ (acetamido-NH); 5.77–5.85$\mu$ (acetamido NH and acetoxy carbonyl); 6.05$\mu$ (acetamido carbonyl); 12.82 and 14.29$\mu$ in concordance with the structure of 4-m-acetamidophenethyl - 1 - acetoxy-8-methyl-5-oxo-5,6,7,8-tetrahydroindane.

This compound is useful as an intermediate for preparing the novel compositions of this invention having hormonal activity.

EXAMPLE 27

5-m-methoxyphenethyl-9-methyldecalin-1,6-dione

Shake 5 - m-methoxyphenethyl-9-methyl-$\Delta^{5(10)}$-octalin-1,6-dione in ethanol (50 cc.) containing palladised charcoal (0.6 g.) with hydrogen for 5 hours; hydrogen uptake ceases when the theoretical amount has been absorbed. Remove the catalyst, and evaporate the solution to a gum consisting of mixed stereoisomers of the reduced diketone 5-m-methoxyphenethyl-9-methyldecalin-1,6-dione.

This compound is useful as an intermediate for preparing the novel compositions of this invention having hormonal activity.

EXAMPLE 28

Hexahydro-4-m-methoxyphenethyl-8-methylindane-1,5-dione

Hydrogenate 5,6,7,8 - tetrahydro-4-m-methylphenethyl-8-methylindane-1,5-dione (0.95 g.) in ethanol (40 cc.) at atmospheric pressure with 10% palladium on charcoal catalyst (0.2 g.); the calculated amount of hydrogen is taken up in 10 hours. Filter and remove solvent to obtain a colorless gum (0.88 g.), ultraviolet absorption peaks at 277, 270 m$\mu$ ($\epsilon$ 1,600, 1,700), as the crude saturated diketone, hexahydro - 4-m-methoxyphenethyl-8-methylindane-1,5-dione.

To prepare hexahydro-5-m-methoxyphenethyl-9-ethyldecalin-1,6-dione, hydrogenate 5-m-methoxyphenethyl-9-ethyl-$\Delta^{5(10)}$-octalin-1,6-dione at atmospheric pressure with 10% palladium on charcoal catalyst according to the manipulative procedure described above.

To prepare hexahydro - 4-m-methoxyphenethyl-8-isopropyl-5,6,7,8-tetrahydroindane-1,5-dione at atmospheric pressure with 10% palladium on charcoal catalyst according to the manipulative procedure described above.

To prepare hexahydro - 4-m - methoxyphenethyl-8-isobutylindane-1,5-dione, hydrogenate 4-m-methoxyphenethyl-8-isobutyl-5,6,7,8-tetrahydroindane-1,5-dione at atmospheric pressure with 10% palladium on charcoal catalyst according to the manipulative procedure described above.

To prepare hexahydro - 4-m-methoxyphenethyl-8-cetylindane-1,5-dione, hydrogenate 4-m-methoxyphenethyl-8-cetyl - 5,6,7,8-tetrahydroindane-1,5-dione at atmospheric pressure with 10% palladium on charcoal catalyst according to the manipuative procedure described above.

To prepare hexahydro 4-(2-m-methoxyphenylpropyl)-8-methylindane-1,5-dione, hydrogenate 4-(2-m-methoxyphenylpropyl) - 8-methyl-5,6,7,8-tetrahydroindane-1,5-dione at atmospheric pressure with 10% palladium on charcoal catalyst according to the manipulative procedure described above.

To prepare hexahydro 4-($\alpha$-methyl-m-methoxyphenethyl)-8-methylindane-1,5-dione, hydrogenate 4-($\alpha$-methyl - m-methoxyphenethyl)-8-methyl-5,6,7,8-tetrahydroindane-1,5-dione at atmospheric pressure with 10% palladium on charcoal catalyst according to the manipulative procedure described above.

To prepare hexahydro 4-phenethyl-8-methylindane-1,5-dione, hydrogenate 4-phenethyl-8-methyl-5,6,7,8-tetrahydroindane-1,5-dione at atmospheric pressure with 10% palladium on charcoal catalyst according to the manipulative procedure described above.

To prepare hexahydro 4-m-hydroxyphenethyl-8-methylindane-1,5-dione, hydrogenate 4-m-hydroxyphenethyl-8-methyl-5,6,7,8-tetrahydroindane-1,5-dione at atmospheric pressure with 10% palladium on charcoal catalyst according to the manipulative procedure described above.

To prepare hexahydro 4-m-hydroxyphenethyl-8-n-propylindane-1,5-dione, hydrogenate 4-m-hydroxyphenethyl-8 - propyl - 5,6,7,8-tetrahydroindane-1,5-dione at atmospheric pressure with 10% palladium on charcoal catalyst according to the manipulative procedure described above.

To prepare hexahydro 4-(3,4-dimethoxyphenethyl)-8-ethylindane-1,5-dione, hydrogenate 4-(3,5-dimethoxyphenethyl) - 8-ethyl-5,6,7,8-tetrahydroindane-1,5-dione at atmospheric pressure with 10% palladium on charcoal catalyst according to the manipulative procedure described above.

To prepare hexahydro 4-(3,5-dimethoxyphenethyl)-8-ethylindane-1,5-dione, hydrogenate 4-(3,5-dimethoxyphenethyl) - 8-ethyl-5,6,7,8-tetrahydroindane-1,5-dione at atmospheric pressure with 10% palladium on charcoal catalyst according to the manipulative procedure described above.

To prepare hexahydro 4-m-acetoxyphenethyl-8-methylindane - 1,5-dione, hydrogenate 4-m-acetoxyphenethyl-8-methyl-5,6,7,8-tetrahydroindane-1,5-dione at atmospheric pressure with 10% palladium on charcoal catalyst according to the manipulative procedure described above.

To prepare hexahydro 4 - m - methoxyphenethyl-8-hydroxypropylindane-1,5-dione, hydrogenate 4-m-methoxyphenethyl - 8-hydroxypropyl-5,6,7,8-tetrahydroindane-1,5-dione at atmospheric pressure with 10% palladium on charcoal catalyst according to the manipulative procedure described above.

To prepare hexahydro 4-m-ethoxyphenethyl-8-ethylindane - 1,5 - dione, hydrogenate 4-m-ethoxyphenethyl-8-ethyl-5,6,7,8-tetrahydroindane-1,5-dione at atmospheric pressure with 10% palladium on charcoal catalyst according to the manipulative procedure described.

To prepare hexahydro 4-m-propoxyphenethyl-8-phenethylindane-1,5-dione, hydrogenate 4-m-propoxyphenethyl-8-phenethyl-5,6,7,8-tetrahydroindane-1,5-dione at atmospheric pressure with 10% palladium on charcoal catalyst according to the manipulative procedure described above.

To prepare hexahydro 4-m-pentyloxyphenethyl-8-isobutylindane-1,5-dione, hydrogenate 4-m-pentyloxyphenethyl-8-isobutyl-5,6,7,8-tetrahydroindane-1,5-dione at atmospheric pressure with 10% palladium on charcoal catalyst according to the manipulative procedure described above.

To prepare hexahydro 4-m-cyclopentyloxyphenethyl-8-hydroxypropylindane-1,5-dione, hydrogenate 4-m-cyclopentyloxyphenethyl-8-hydroxypropyl-5,6,7,8-tetrahydroindane-1,5-dione at atmospheric pressure with 10% palladium on charcoal catalyst according to the manipulative procedure described above.

To prepare hexahydro 4-m-hydroxyphenethyl-8-phenethylindane-1,5-dione, hydrogenate 4-m-hydroxyphenethyl - 8 - phenethyl - 5,6,7,8 - tetrahydroindane-1,5-dione according to the manipulative procedure described above.

To prepare hexahydro 4-(3,4-dimethoxyphenethyl)-8-diethylaminoethylindane-1,5-dione, hydrogenate 4-(3,4-dimethoxyphenethyl) - 8 - diethylaminoethyl - 5,6,7,8 - tetrahydroindane-1,5-dione according to the manipulative procedure described above.

To prepare hexahydro 4-[2-(3,5-dimethoxyphenyl)propyl]-8-dimethylaminopropylindane-1,5 - dione, hydrogenate 4 - [2-(3,5-dimethoxyphenyl)propyl]-8-dimethylaminopropyl-5,6,7,8-tetrahydroindane-1,5-dione according to the manipulative procedure described above.

To prepare hexahydro 4-[2-(3,5-diethoxyphenyl)butyl]-8-butylindane-1,5-dione, hydrogenate 4-[2-(3,5-diethoxyphenyl)butyl] - 8-butyl-5,6,7,8-tetrahydroindane-1,5-dione at atmospheric pressure with 10% palladium on charcoal catalyst according to the manipulative procedure described above.

To prepare hexahydro 4-(3-methoxy-4-ethoxyphenethyl) - 8 - propylindane - 1,5 - dione, hydrogenate 4-(3-methoxy - 4 - ethoxyphenethyl) - 8 - propyl-5,6,7,8-tetrahydroindane-1,5-dione at atmospheric pressure with 10% palladium on charcoal catalylst according to the manipulative procedure described above.

These compounds are useful as intermediates for preparing the novel compositions of this invention having hormonal activity.

EXAMPLE 29

Hexahydro-4-m-methoxyphenethyl-8-methyl-5-oxoindan-1-ol

Dissolve 5,6,7,8 - tetrahydro-4-m-methoxyphenethyl-8-methyl-5-oxoindan-1-ol in ethanol (30 cc.) and add 10% palladium on charcoal catalyst (0.3 g.). Shake the mixture in hydrogen at atmospheric pressure, the theoretical amount of hydrogen being taken up in 8 hours. Filter off the catalyst and remove the solvent under reduced pressure, to obtain a gum, ultraviolet absorption peaks at 277, 270 m$\mu$ ($\epsilon$ 1,500, 1,700), consistent with the structure of hexahydro - 4 - m-methoxyphenethyl-8-methyl-5-oxoindan-1-ol.

This compound possesses estrogenic activity and is useful as an intermediate for preparng the hormonal compounds of this invention.

EXAMPLE 30

Hexahydro-4-m-methoxyphenethyl-8-methylindane-1,5-dione

Dissolve the saturated keto-alcohol of the previous example (0.815 g.) in pyridine (25 cc.), cool in ice and add recrystallized chromium trioxide (0.815 g.) gradually with stirring under nitrogen. Allow the mixture to stand at room temperature for 20 hours, then dilute with ethyl acetate (20 cc.). Filter the brown mixture through a short alumina column wetted with ethyl acetate and remove the solvent from the filtrate, to obtain as gummy residue crude hexahydro-4-m-methoxyphenethyl-8-methylindane-1,5-dione (0.77 g.); infrared absorption peaks at 5.75 and 5.85$\mu$.

This compound is useful as an intermediate for preparing the novel compositions of this invention having a hormonal activity.

EXAMPLE 31

4-m-methoxyphenethyl-8-ethyl-trans-hexahydroindane-1,5-dione

Dissolve 4 - m - methoxyphenethyl-8-ethyl-5,6,7,8-tetrahydroindane-1,5-dione (2 g.) in ethanol (50 cc.) containing 10% palladised charcoal (0.6 g.) and shake in an atmosphere of hydrogen for 12 hours, when hydrogen uptake almost ceases. Remove the catalyst by filtration and evaporate the solvent to a gum which is dissolved in a little benzene and filtered through a short column of alumina. Evaporate the solvent to obtain a gum consisting of stereoisomers of the diketone 4-m-methoxyphenethyl-8-ethyl-trans-hexahydroindane - 1,5 - dione; infrared absorption peaks at 5.75 and 5.85$\mu$.

This compound is useful as an intermediate for preparing the novel compositions of this invention having a hormonal activity.

EXAMPLE 32

4-m-methoxyphenethyl-8-ethyl-5-oxo-trans-hexahydroindan-1-ol

Hydrogenate 4 - m - methoxyphenethyl-8-ethyl-5-oxo-5,6,7,8-tetrahydroindan-1-ol (2 g.) as for the preparation of the corresponding 8-methyl compound to obtain 4-m-methoxyphenethyl - 8 - ethyl-5-oxo-trans-hexahydroindan-1-ol as a gum.

This compound is useful as an intermediate for preparing the novel compositions of this invention having hormonal activity.

EXAMPLE 33

4-m-methoxyphenethyl-8-ethyl-trans-hexahydroindane-1,5-dione

Dissolve 4 - m - methoxyphenethyl-8-ethyl-5-oxo-trans-hexahydroindan-1-ol (1 g.) in pyridine (30 cc.) and add chromium trioxide (1.6 g.) carefully with stirring under nitrogen. Allow the mixture to stand at room temperature for 24 hours, add ethyl acetate (20 cc.), and filter the mixture through a short column of alumina with ethyl acetate. Remove the solvent to obtain 4-m-methoxyphenethyl-8-ethyl-trans-hexahydroindane-1,5-dione as a gum; infrared abrosption peaks at 5.75, 5.85μ.

This compound is useful as an intermediate for preparing the novel compositions of this invention having hormonal activity.

EXAMPLE 34

9-methyl-5-phenethyldecalin-1,6-dione

Dissolve the tricyclic diketone 9-methyl-5-phenethyl-$\Delta^{5(10)}$-octalin-1,6-dione (3 g.) in ethanol (75 cc.) and add 10% palladised charcoal (0.9 g.); shake the mixture in hydrogen until a molecular equivalent of hydrogen has been absorbed. Isolate the product from the mixture as a gum, which is taken up in ethanol (300 cc.) containing 20% sulphuric acid (3 cc.) and reflux for 2 hours to ensure equilibration at the 5-position. Work up and recrystallize from ethanol to obtain the diketone 9-methyl-5-phenethyldecalin-1,6-dione (1.7 g.), M.P. 96–8°; infrared absorption peaks at 5.86μ.

$C_{19}H_{24}O_2$, percent.—Calculated: C, 80.2; H, 8.5. Found: C. 80.1; H, 8.65.

This compound is useful as an intermediate for preparing the novel compositions of this invention having hormonal activity.

EXAMPLE 35

4-m-hydroxyphenethyl-8-ethyl-trans-hexahydroindane-1,5-dione

Shake 4 - m-hydroxyphenethyl-8-ethyl-5,6,7,8-tetrahydroindane-1,5-dione (2 g.) in ethanol (30 cc.) with 10% palladised charcoal (0.7 g.) in an atmosphere of hydrogen until 1.1 M. of hydrogen has been absorbed. Filter the catalyst and evaporate the solvent to obtain 4-m-hydroxyphenethyl - 8 - ethyl-trans-hexahydroindane-1,5-dione; infrared absorption peaks at 5:75, 5.85μ.

This compound is useful as an intermediate for preparing the novel compositions of this invention having hormonal activity.

EXAMPLE 36

5-m-methoxyphenethyl-9-methyl-6-oxodecalin-1-ol

Add 5 - m - methoxyphenethyl-9-methyl-6-oxo-$\Delta^{5(10)}$-octalin-1-ol (2.8 g.) in tetrahydrofuran (30 cc.) with stirring to lithium (350 mg) in liquid ammonia (300 cc.). Stir the mixture for a further 5 minutes and add sodium nitrate to discharge the blue color. The gummy product has an infrared spectrum consistent with the structure of 5-m-methoxyphenethyl-9-methyl-6-oxo-decalin-1-ol.

This compound is useful as an intermediate for preparing the novel compositions of this invention having hormonal activity.

EXAMPLE 37

5-m-methoxyphenethyl-9-methyl-trans-decalin-1,6-dione

Dissolve the product of the previous example in pyridine (30 cc.), add to chromium trioxide (4 g.) in pyridine (40 cc.) and keep the mixture 24 hours. Add water, and extract the mixture with etherbenzene; wash and dry the extracts. Remove the solvent and recrystallize the residue from ether and from light petroleum-ethyl acetate to obtain the diketone, 5-m-methoxyphenethyl-9-methyl-trans-decalin-1,6-dione (1.72 g.; 61%), M.P. 92–93° C.

$C_{20}H_{26}O_3$, percent.—Calculated: C, 76.4; H, 8.4. Found: C, 76.3; H, 8.3.

This compound is useful as an intermediate for preparing the novel compositions of this invention having hormonal activity.

EXAMPLE 38

1,1-ethylenedioxy-9-methyl-5-phenethyldecalin-6-one

Add the ketal 1,1-ethylenedioxy-9-methyl-5-phenethyl-$\Delta^{5(10)}$-octalin-6-one (5 g.) in tetrahydrofuran (47 cc.) to a solution of lithium (0.54 g.) in liquid ammonia (460 cc.). Stir the mixture for 15 minutes and discharge the blue color by the addition of solid sodium nitrite. Work up the product in the usual way by means of ether to obtain a gum which crystallizes on adding ethanol. Recrystallize from methanol to obtain the reduced ketal 1,1 - ethylenedioxy - 9-methyl-5-phenethyldecalin-6-one (4.6 g.), M.P. 81–2° C.; infrared absorption peaks at 5.88, 8.40, 13.33, 14.29μ.

$C_{21}H_{28}O_3$, percent.—Calculated: C, 76.8; H, 8.6. Found: C, 77.0; H, 8.7.

This compound is useful as an intermediate for preparing the novel compositions of this invention having hormonal activity.

EXAMPLE 39

4-m-methoxyphenethyl-8-methyl-1-methoxy-trans-hexahydroindan-5-one

Shake 4 - m-methoxyphenethyl-8-methyl-1-methoxy-5,6,7,8-tetrahydroindan-5-one (0.32 g.) in ethanol (20 cc.) with 10% palladium on charcoal catalyst (0.2 g.) in an atmosphere of hydrogen until 25 cc. of hydrogen has been absorbed. Filter the catalyst and evaporate the solvent to obtain 4-m-methoxyphenethyl-8-methyl-1-methoxy-trans-hexahydroindan-5-one as a gum; infrared absorption peak at 5.85μ.

This compound is useful as an intermediate for preparing the novel compositions of this invention having hormonal activity.

EXAMPLE 40

13β-methyl-3-methoxygona-1,3,5(10),8,14-pentaen-17-one

Heat the tricyclic diketone 5,6,7,8-tetrahydro-4-m-methoxyphenethyl - 8-methylindane-1,5-dione (0.25 g.), under nitrogen at 60° with a mixture of orthophosphoric acid (5 cc., S.G. 1.8) and phosphorus pentoxide (3.25 g.) for 20 minutes. Work up by means of ether to obtain a partially crystalline product which one takes up in benzene (10 cc.) and filters. Recrystallize the residue to obtain the diene 13β-methyl-3-methoxygona-1,3,5(10),8,14-pentaen-17-one (0.6 g.), M.P. 110–2° C.; ultraviolet absorption peaks at 310 mμ ($\epsilon$ 37,200); infrared absorption peak at 5.78μ.

This compound has estrogenic activity, lowers the blood lipid level, and is useful as an intermediate for preparing the hormonal compounds of this invention.

EXAMPLE 41

D-homo-13β-methyl-3-methoxy-gona-1,3,5(10),9-tetraen-17a-one

Dissolve the crude reduced diketone obtained by catalytic hydrogenation of 5-(2-m-methoxyphenylethyl)-9-methyl-6-oxo-$\Delta^{5(10)}$-octalin-1-one in methanol (16 cc.) containing concentrated hydrochloric acid (4 cc.). Keep the solution for 3 hours at room temperature and then 1 hour at 0° C. Filter the crystalline precipitate of cyclodehydrated product and recrystallize from ethyl acetate to obtain D-homo-13β-methyl-3-methoxy-gona-1,3,5(10),9-tetraen-17a-one (0.96 g., 51%), M.P. 172–175° C.; ultraviolet absorption peak at 262 mμ ($\epsilon$ 18,700).

$C_{20}H_{24}O_2$, percent.—Calculated: C, 81.9; H, 8.2. Found: C, 80.8; H, 8.1.

This compound possesses estrogenic activity, lowers the blood lipid level and is useful as an intermediate in the preparation of the hormonal compounds of this invention.

EXAMPLE 42

D-homo-13β-methyl-3-methoxy-gona-1,3,5(10),9-tetraen-17a-one

Reflux the crude reduced diketone (1 g.) starting material of the previous example in ethanol (25 cc.) with 20% sulphuric acid (0.2 cc.) for 2 hours. Cool, and filter the precipitate solid (273 mg.) and recrystallize from ethanol-ethyl acetate mixture to obtain D-homo-13β-methyl-3-methoxy-gona-1,3,5(10),9-tetraen-17a-one.

This compound possesses estrogenic and blood lipid lowering activity and is useful as an intermediate for preparing the hormonal compounds of this invention.

EXAMPLE 43

D - homo - 13β-methyl-3-methoxy-gona-1,3,5(10),9-tetraen - 17a - one and D-homo-13β-methyl-3-methoxy-gona-1,3,5(10),8-tetraen-17a-one Reflux the crude reduced diketone (0.5 g.) starting material of the previous example in ethanol (25 cc.) with 20% sulphuric acid (10 cc.) for 2 hours; add water to the cooled solution and ether extract the mixture. Evaporate the washed and dried ether extract and obtain an ultraviolet absorption characteristics identical with those of the mixed dehydro compounds.

These compounds possess estrogenic and blood lipid lowering activity and are useful as intermediates in the preparation of the hormonal compounds of this invention.

EXAMPLE 44

D-homo-13β-methyl-3-methoxy-gona-1,3,5(10),9-tetraen-17a-one

Keep 5 - (2 - m-methoxyphenylethyl)-9-methyl-trans-decalin-1,6-dione (0.5 g.) in methanol (8 cc.) containing 10 N hydrochloric acid (2 cc.) for 3 hours at room temperature, then cool to 0° C. for an hour. Recrystallize the filtered precipitate from ethanol-ethyl acetate mixture to obtain D-homo-13β-methyl-3-methoxy-gona-1,3,5(10), 9-tetraen-17a-one (0.32 g., 68%), M.P. 172–5° C.

This compound possesses estrogenic activity, lowers the blood lipid level, and is useful as an intermediate for preparing the hormonal compounds of this invention.

EXAMPLE 45

13β-methyl-3-methoxy-gona-1,3,5(10),9-tetraen-17-one

Allow the diketone 4 - (2 - m - methoxyphenylethyl)-8 - methyl - trans - hexahydroindan - 1,5 - dione (0.77 g.) in methanol (25 cc.) and concentrated hydrochloric acid (4 cc.) to stand overnight at 0° C. Treat the mixture with water (50 cc.) and extract with a mixture of ether and benzene. Evaporate the washed and dried extracts to leave a gum which crystallizes (0.65 g.). Recrystallize from a mixture of ethyl acetate and ethanol to obtain 13β-methyl-3 - methoxy - gona - 1,3,5(10),9 - tetraen - 17 - one, M.P. 144–148° C.

This compound possesses estrogenic activity, lowers the blood lipid level, and is useful as an intermediate for preparing the hormonal compounds of this invention.

EXAMPLE 46

13β-ethyl-3-methoxy-gona-1,3,5(10)9-tetraen-17-one

Allow the diketone 4 - (2 - m - methoxyphenylethyl)-3 - ethyl - trans - hexahydroindan - 1,5 - dione (0.8 g.) in methanol (25 cc.) and concentrated hydrochloric acid (4 cc.) to stand 15 hours at 0° C. Filter the precipitate and recrystallize from methanol to give 13β - ethyl - 3 - methoxy - gona - 1,3,5(10),9 - tetraen - 17 - one; ultraviolet absorption peak at 264 mμ (ε 18,000); infrared absorption peak at 5.78μ.

This compound possesses estrogenic and blood lipid lowering activity and is useful as an intermediate for preparing the hormonal compounds of this invention.

EXAMPLE 47

13β-ethyl-3-methoxy-gona-1,3,5(10),9-tetraen-17β-ol

Add concentrated hydrochloric acid to a solution of 4 - (2 - m - methoxyphenylethyl) - 8 - ethyl - 5 - oxo-5,6,7,8 - tetrahydroindan - 1 - ol (0.5 g.) in methanol (10 cc.) until the solution becomes permanently cloudy. Scratch the solution with a seed of product, filter and precipitate and recrystallize from hexane to obtain 13β-ethyl 3 - methoxy - gona - 1,3,5(10),9 - tetraen - 17β - ol; ultraviolet absorption peak at 264 mμ (ε 17,600).

EXAMPLE 48

13β-ethyl-3-hydroxy-gona-1,3,5(10),9-tetraen-17-one

Dissolve 4 - (2 - m - hydroxyphenylethyl) - 8 - ethyl-trans - hexahydroindan - 1,5 - dione (1 g.) in methanol (15 cc.) and add concentrated hydrochloric acid (3 cc.). Warm the mixture at 40° for 1 hour, and then cool to 0°. Filter the precipitate and wash with cold methanol. Dry the product over phosphorus pentoxide to obtain 13β-ethyl - 3 - hydroxy - gona - 1,3,5(10),9 - tetraen - 17-one, M.P. 262–4°; ultraviolet absorption peak at 267 mμ (ε 15,000).

This compound has estrogenic activity, lowers the blood lipid level, and is useful as an intermediate for preparing the hormonal compounds of this invention.

EXAMPLE 49

13β-methyl-3-methoxy-gona-1,3,5(10),9-tetraen-17β-ol

Treat the keto-alcohol 4-(2-m-methoxyphenylethyl)-8-methyl - 5 - oxo - trans - hexahydroindan - 1 - ol (0.25 g.) in methanol (2.5 cc.) with concentrated hydrochloric acid (1.5 cc.) at 0°, and afterwards allow the solution to warm up to room temperature. After 30 minutes filter the precipitate formed to obtain 13β - methyl - 3 - methoxy-gona - 1,3,5(10),9 - tetraen - 17β - ol (0.65 g.), M.P. 114–128°; ultraviolet absorption peak at 264 mμ (ε 18,500).

This compound has estrogenic activity, lowers the blood lipid level, and is useful as an intermediate for preparing the hormonal compounds of this invention.

EXAMPLE 50

13β-methyl-3-methoxy-gona-1,3,5(10)-trien-17β-ol

Add 13β - methyl - 3 - methoxy - gona - 1,3,5(10),8-tetraen - 17 - one (M.P. 110–20°, 0.25 g.) dissolved in tetrahydrofuran (15 cc.) to a solution of potassium (0.1 g.) in liquid ammonia (70 cc.). Add further potassium (0.3 g.) to the stirred solution during 5 minutes and then stir the solution for 1 hour. Add ammonium chloride (2 g.), followed, when the blue color has been discharged, by water (50 cc.). Extract the mixture with ether and evaporate the washed and dried extracts to a gum to obtain 13β - methyl - 3 - methoxy - gona - 1,3,5(10)-trien-17β-ol.

This compound has estrogenic activity, lowers the blood lipid level, and is useful as an intermediate for preparing the hormonal compounds of this invention.

EXAMPLE 51

13β-methyl-3-methoxy-gona-1,3,5(10)-trien-17-one

Dissolve 13β - methyl - 3 - methoxy - gona - 1,3,5(10)-trien - 17β - ol in acetone (30 cc.) and add 8 N chromic acid (0.3 cc.) drop by drop to the swirled solution, followed after a 1 - minute interval by methanol (5 cc.). Remove most of the solvent under reduced pressure, add water (50 cc.) and extract the product with a mixture of equal volumes of ether and benzene. Evaporate the washed and dried extracts and crystallize the residue from ethanol to obtain 13β - methyl - 3 - methoxy - gona-1,3,5(10) - trien - 17 - one (0.114 g.), M.P. 137–42°. Purify further by recrystallization to obtain the pure compound, M.P. 143–4°, whose infrared spectrum is identical with that of 13β - methyl - 3 - methoxy - gona - 1,3,5(10)-trien - 17 - one obtained from natural estrone.

The subject matter which the applicants regard as their invention is particularly pointed out and distinctly claimed as follows:

1. Chemical compounds having a 5,6,7,8-tetrahydro-4-phenethylindane-1,5-dione nucleus, said nucleus having attached thereto in the 8-position, an alkyl radical, and the phenyl of the 4-phenethyl group of said nucleus bearing at least one para-directing group and being unsubstituted in at least one position ortho to the point of attachment.

2. Chemical compounds having a hexahydro- 4 - phenethylindane - 1,5 - dione nucleus, said nucleus having attached thereto in the 8 - position a polycarbon - alkyl radical, and the phenyl of the 4-phenethyl group of said nucleus bearing at least one para-directing group and being unsubstituted in at least one position ortho to the point of attachment.

3. Chemical compounds having a 5,6,7,8-tetrahydro-4-phenethylindane-1-ol-5-one nucleus, said nucleus having attached thereto in the 8-position, an alkyl radical, and the phenyl of the 4-phenethyl group of said nucleus bearing at least one para-directing group and being unsubstituted in at least one position ortho to the point of attachment.

4. Chemical compounds having a hexahydro-4-phenethylindane-1-ol-5-one nucleus, said nucleus having attached thereto in the 8-position, a polycarbonalkyl radical, and the phenyl of the 4-phenethyl group of said nucleus bearing at least one para-directing group and being unsubstituted in at least one position ortho to the point of attachment.

5. A compound of claim 1, wherein the 5,6,7,8-tetrahydro-4-phenethyl-8-alkylindane-1,5-dione nucleus bears a m-methoxy radical on the phenethyl moiety.

6. A compound of claim 2, wherein the hexahydro-4-phenethyl - 8 - alkylindane - 1,5 - dione nucleus bears a m-methoxy radical on the phenethyl moiety.

7. A compound of claim 3, wherein the 5,6,7,8-tetrahydro-4-phenethyl-8-alkyl-5-oxoindan-1-ol nucleus bears a m-methoxy radical on the phenethyl moiety.

8. A compound of claim 4, wherein the hexahydro-4-m-methoxyphenethyl - 8 - alkyl-5-oxoindan-1-ol nucleus bears a m-methoxy radical on the phenethyl moiety.

9. The 17 - ethylenedioxy ketal of a compound of claim 5.

10. A process for preparing a gona-1,3,5(10)-triene nucleus substituted at the 13-position with a monovalent polycarbon-alkyl radical comprising:
(a) reacting a compound having a 2-(6-phenyl-3-oxohexyl) - 1,3 - cyclopentanedione nucleus, the phenyl group of said nucleus having at least one ortho-para directing substituent group and at least one position ortho to the position of chain attachment free of substituent groups, under aldol conditions, to form a compound having a 4-phenethyl-5,6,7,8-tetrahydroindane-1,5-dione nucleus;
(b) catalytically hydrogenating said tetrahydro-indane compound to form a compound having a 4-phenethyl - hexahydro - transindane-1,5-dione nucleus;
(c) cyclodehydrating said hexahydro - indane compound with a dehydrating acid to form a compound having a gona-1,3,5(10),9(11)-tetraene nucleus; and
(d) saturating with hydrogen the 9(11)-position unsaturation of said 1,3,5(10),9(11)-tetraene.

11. A process for preparing a 5,6,7,8-tetrahydro-4-phenethylindane-5-one having attached thereto in the 8-position, an alkyl group, comprising reacting a compound having a 5,6,7,8-tetrahydro-indan-5-one nucleus having attached thereto in the 8-position, a monovalent alkyl group with a phenethylating group under basic conditions.

12. A process for preparing a gona-1,3,5(10)-triene comprising:
(a) selectively reducing 1-keto group of a 5,6,7,8-tetrahydro-4-phenethylindane-1,5-dione with a complex metal hydride to obtain a 5,6,7,8-tetrahydro-4-phenylindan-1-ol-4-one;
(b) catalytically hydrogenating the C-ring unsaturation of said indane;
(c) cyclodehydrating in the presence of a dehydrating acid to obtain a gona-1,3,5(10),9(11)-tetraene; and
(d) saturating with hydrogen the 9(11) bond of said tetraene to form a gona-1,3,5(10)-triene.

13. A process for preparing a gona-1,3,5(10),8,14-pentaene comprising cyclodehydrating a 5,6,7,8-tetrahydro-4-phenethylindane-1,5-dione nucleus having an ortho-para directing group attached to the aromatic ring and at least one position ortho to the position of chain attachment free of substituent groups and having attached thereto in the 8-position a monovalent alkyl group in the presence of a dehydrating acid.

14. 5,6,7,8 - tetrahydro - 4 - m - methoxyphenethyl-8-methylindane-1,5-dione.

15. 5,6,7,8 - tetrahydro - 4 - m - methoxyphenethyl-8-ethylindane-1,5-dione.

16. Hexahydro - 4 - m - methoxyphenethyl - 8 - methylindane-1,5-dione.

17. Hexahydro - 4 - m - methoxyphenethyl - 8 - ethylindane-1,5-dione.

18. 5,6,7,8 - tetrahydro - 4 - m - methoxyphenethyl-8-methyl-5-oxoindan-1-ol.

19. 5,6,7,8 - tetrahydro - 4 - m - methoxyphenethyl-8-ethyl-5-oxoindan-1-ol.

20. Hexahydro - 4 - m - methoxyphenethyl - 8 - methylindane-5-oxoindan-1-ol.

21. Hexahydro - 4 - m - methoxyphenethyl - 8 - ethylindane-5-oxoindan-1-ol.

No references cited.

HENRY A. FRENCH, *Primary Examiner.*

U.S. Cl. X.R.

260—397.4, 397.45, 397.5, 570.5, 590, 618, 650, 668; 167—65, 74